(12) United States Patent
Gao et al.

(10) Patent No.: US 12,155,590 B2
(45) Date of Patent: Nov. 26, 2024

(54) REFERENCE SIGNAL TRANSMISSION

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

(*) Notice: Subject to any disclaimer, the term of this patent is extended or adjusted under 35 U.S.C. 154(b) by 659 days.

(21) Appl. No.: 17/288,401

(22) PCT Filed: Nov. 1, 2018

(86) PCT No.: PCT/CN2018/113535
§ 371 (c)(1),
(2) Date: Apr. 23, 2021

(87) PCT Pub. No.: WO2020/087473
PCT Pub. Date: May 7, 2020

(65) Prior Publication Data
US 2021/0385038 A1 Dec. 9, 2021

(51) Int. Cl.
*H04L 5/00* (2006.01)
*H04J 13/12* (2011.01)

(52) U.S. Cl.
CPC .......... *H04L 5/0048* (2013.01); *H04J 13/12* (2013.01)

(58) Field of Classification Search
CPC ....... H04L 5/0048; H04L 5/10; H04L 5/0051; H04L 5/0094; H04J 13/12; H04W 72/0446; H04W 72/0466
See application file for complete search history.

(56) References Cited

U.S. PATENT DOCUMENTS

2018/0026684 A1  1/2018  Wei et al.
2019/0013910 A1*  1/2019  Zhang .................. H04L 1/1896
(Continued)

FOREIGN PATENT DOCUMENTS

CN  106559199 A  4/2017
CN  110912666 A  3/2020
(Continued)

OTHER PUBLICATIONS

VIVO, "Discussion on low PAPR RS", 3GPP TSG RAN WG1 Meeting #94bis, RI-1810405, Oct. 12, 2018, 4 pages, Chengdu, China.
(Continued)

*Primary Examiner* — Shukri Taha
(74) *Attorney, Agent, or Firm* — Sughrue Mion, PLLC

(57) ABSTRACT

Embodiments of the present disclosure relate to methods, devices and computer readable media for Reference Signal (RS) transmission. A method for communication comprises determining one or more RS ports for RS transmission, the one or more RS ports being included in one or more RS groups. The method further comprises determining a plurality of parameters for generating a RS sequence specific to a RS group in the one or more RS groups, the RS group including at least one of the one or more RS ports. The method further comprises generating the RS sequence based on the plurality of parameters. In addition, the method further comprises transmitting the generated RS sequence over the at least one of the one or more RS ports. The embodiments of the present disclosure can solve the PAPR issue caused by mapping a same RS sequence to antenna ports across RS port groups.

6 Claims, 7 Drawing Sheets

| Value | Number of DMRS CDM group(s) without data | DMRS port(s) |
|---|---|---|
| 0 | 1 | 0, 1 |
| 1 | 2 | 0, 1 |
| 2 | 2 | 2, 3 |
| 3 | 2 | 0, 2 |
| 4-7 | Reserved | Reserved |

Two CDM group specific sequences needed

(56) References Cited

U.S. PATENT DOCUMENTS

| | | | |
|---|---|---|---|
| 2019/0306923 A1* | 10/2019 | Xiong | H04J 13/0062 |
| 2020/0015200 A1* | 1/2020 | Vilaipornsawai | H04W 72/23 |
| 2020/0083939 A1* | 3/2020 | Park | H04L 5/0051 |
| 2020/0107307 A1* | 4/2020 | Nammi | H04L 5/0051 |
| 2020/0162228 A1* | 5/2020 | Gao | H04L 5/0051 |
| 2022/0116247 A1* | 4/2022 | Sengupta | H04L 5/0094 |

FOREIGN PATENT DOCUMENTS

| | | |
|---|---|---|
| JP | 2022-500925 A | 1/2022 |
| JP | 2022-504608 A | 1/2022 |

OTHER PUBLICATIONS

Mediatek Inc. "Low PAPR RS", 3GPP TSG RAN WGI Meeting #94bis, RI-1810437, Oct. 12, 2018, 12 pages, Chengdu, China.

Ericsson, "On specification-based solutions to the DMRS PAPR issue", 3GPP TSG RAN WG1 Meeting #94-bis, RI-1811542, Oct. 12, 2018, 5 pages, Chengdu, China.

"Physical channels and modulation", 3GPP TS 38.211 version 15.3.0 Release 15, Oct. 2018, V15.3.0, 98 pages, France.

International search report for PCT/CN2018/113535 dated Jul. 10, 2019.

Written Opinion for PCT/CN2018/113535 dated Jul. 10, 2019.

Office Action Mar. 7, 2023 in Japanese Application No. 2021-523634.

OPPO, "Discussion on RS enhancement for PAPR reduction", 3GPP TSG RAN WG1 Meeting #94bis, R1-1810967, Chengdu, China, Oct. 8-12, 2018 (4 pages total).

Ericsson, "Feature lead proposal on low PARR DMRS", 3GPP TSG RAN WG1 Meeting #94bis, R1-1811988, Chengdu, China, Oct. 8-12, 2018 (6 pages total).

Extended European Search Report dated Oct. 11, 2021 from the European Patent Office in EP Application No. 18938967.9.

\* cited by examiner

| Value | Number of DMRS CDM group(s) without data | DMRS port(s) |
|---|---|---|
| 0 | 1 | 0, 1 |
| 1 | 2 | 0, 1 |
| 2 | 2 | 2, 3 |
| 3 | 2 | 0, 2 |
| 4-7 | Reserved | Reserved |

Two CDM group specific sequences needed

| Value | Number of DMRS CDM group(s) without data | DMRS port(s) |
|---|---|---|
| 0 | 2 | 0-2 |
| 1 | 3 | 0-2 |
| 2 | 3 | 3-5 |
| 3 | 3 | 0, 1, 6 |
| 4 | 3 | 2, 3, 8 |
| 5 | 3 | 4, 5, 10 |
| 6-31 | Reserved | Reserved |

Two CDM group specific sequences needed

REFERENCE SIGNAL TRANSMISSION

CROSS-REFERENCE TO RELATED APPLICATIONS

This application is a National Stage of International Application No. PCT/CN2018/113535 filed Nov. 1, 2018.

TECHNICAL FIELD

Embodiments of the present disclosure generally relate to the field of telecommunication, and in particular, to methods and apparatuses for Reference Signal (RS) transmission.

BACKGROUND

The latest developments of the Third Generation Partnership Project (3GPP) standards are referred to as Long Term Evolution (LTE) of Evolved Packet Core (EPC) network and Evolved UMTS Terrestrial Radio Access Network (E-UTRAN), also commonly termed as '4G'. In addition, the term '5G New Radio (NR)' refers to an evolving communication technology that is expected to support a variety of applications and services. 5G NR is part of a continuous mobile broadband evolution promulgated by 3GPP to meet new requirements associated with latency, reliability, security, scalability, and so on.

Recently, new work items for enhancements on Multi-input Multi-output (MIMO) in NR have been approved. One objective is to specify Channel State Information-Reference Signal (CSI-RS) and Demodulation Reference Signal (DMRS) (both downlink and uplink) enhancements for peak-to-average power ratio (PAPR) reduction without change on the mapping of resource elements (REs). For example, the DMRS PAPR issue is a consequence of mapping a same DMRS sequence to antenna ports across different Code Domain Multiplexing (CDM) groups. This results in a repetition of sequence values in the frequency domain which can translate to a higher PAPR than alternative mappings that would have avoided such repetition. The enhancements on CSI-RS and DMRS should not change the RE mapping specified previously. In other words, a solution to the PAPR issue shall not change the mapping of RS ports. Moreover, it is desirable that the solution can also provide backward compatibility, low complexity and small impacts on the specifications.

SUMMARY

In general, example embodiments of the present disclosure provide methods, devices and computer readable media for RS transmission.

In a first aspect, there is provided a method for communication. The method comprises determining, at a first communication device, one or more RS ports for RS transmission, the one or more RS ports being included in one or more RS groups. The method further comprises determining a plurality of parameters for generating a RS sequence specific to a RS group in the one or more RS groups, the RS group including at least one of the one or more RS ports. The method further comprises generating the RS sequence based on the plurality of parameters. In addition, the method further comprises transmitting, from the first communication device, the generated RS sequence over the at least one of the one or more RS ports to a second communication device.

In a second aspect, there is provided a method for communication. The method comprises determining, at a second communication device, one or more RS ports for RS transmission, the one or more RS ports being included in one or more RS groups. The method further comprises determining a plurality of parameters for generating a RS sequence specific to a RS group in the one or more RS groups, the RS group including at least one of the one or more RS ports. The method further comprises determining the RS sequence based on the plurality of parameters. In addition, the method further comprises receiving, from a first communication device, the determined RS sequence over the at least one of the one or more RS ports.

In a third aspect, there is provided a first communication device. The first communication device comprises a processor and a memory coupled to the processor. The memory stores instructions that when executed by the processor, cause the first communication device to perform actions. The actions comprise: determining one or more RS ports for RS transmission, the one or more RS ports being included in one or more RS groups; determining a plurality of parameters for generating a RS sequence specific to a RS group in the one or more RS groups, the RS group including at least one of the one or more RS ports; generating the RS sequence based on the plurality of parameters; and transmitting the generated RS sequence over the at least one of the one or more RS ports to a second communication device.

In a fourth aspect, there is provided a second communication device. The second communication device comprises a processor and a memory coupled to the processor. The memory stores instructions that when executed by the processor, cause the terminal device to perform actions. The actions comprise: determining one or more RS ports for RS transmission, the one or more RS ports being included in one or more RS groups; determining a plurality of parameters for generating a RS sequence specific to a RS group in the one or more RS groups, the RS group including at least one of the one or more RS ports; determining the RS sequence based on the plurality of parameters; and receiving, from a first communication device, the determined RS sequence over the at least one of the one or more RS ports.

In a fifth aspect, there is provided a computer readable medium having instructions stored thereon. The instructions, when executed on at least one processor, cause the at least one processor to carry out the method according to the first aspect of the present disclosure.

In a sixth aspect, there is provided a computer readable medium having instructions stored thereon. The instructions, when executed on at least one processor, cause the at least one processor to carry out the method according to the second aspect of the present disclosure.

In a seventh aspect, there is provided a computer program product that is tangibly stored on a computer readable storage medium. The computer program product includes instructions which, when executed on at least one processor, cause the at least one processor to carry out the method according to the first aspect or the second aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

Figure 1:
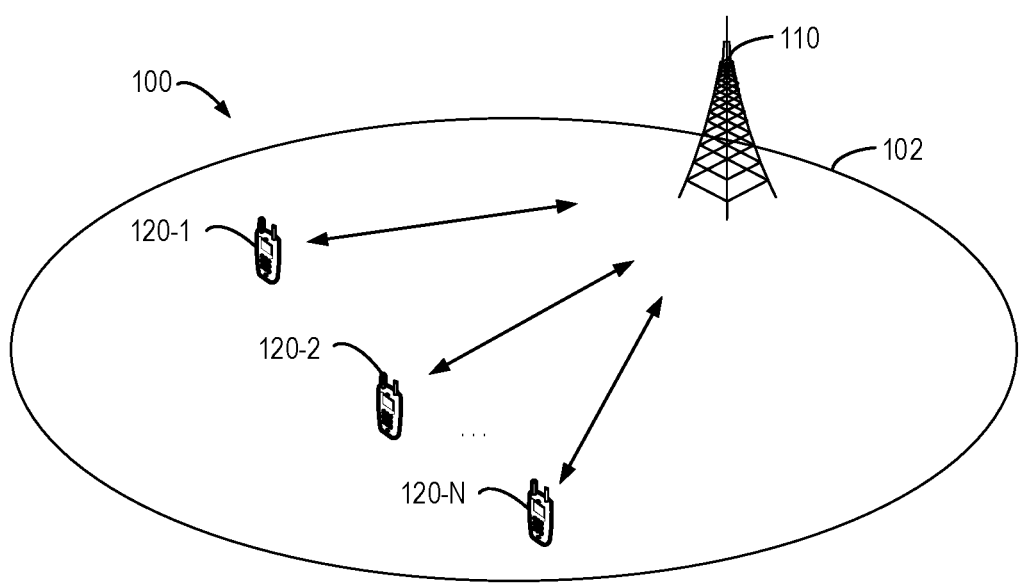
FIG. 1 illustrates an example communication network in which embodiments of the present disclosure can be implemented.

FIG. 1 shows an example communication network 100 in which implementations of the present disclosure can be implemented. The communication network 100 includes a network device 110 and terminal devices 120-1, 120-2 . . . and 120-N (where N is a natural number), which can be collectively referred to as "terminal devices" 120 or individually referred to as "terminal device" 120. The network 100 can provide one or more cells 102 to serve the terminal device 120. It is to be understood that the number of network devices, terminal devices and/or cells is given for the purpose of illustration without suggesting any limitations to the present disclosure. The communication network 100 may include any suitable number of network devices, terminal devices and/or cells adapted for implementing implementations of the present disclosure.

As used herein, the term 'terminal device' refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UE as an example of the terminal device 120.

As used herein, the term 'network device' or 'base station' (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Remote Radio Unit (RRU), a radio head (RH), a remote radio head (RRH), a transmission and reception point (TRP), a low power node such as a femto node, a pico node, and the like. For the purpose of discussion, in the following, some embodiments will be described with reference to gNB as examples of the network device 110.

In the communication network 100 as shown in FIG. 1, the network device 110 can communicate data and control information to the terminal device 120 and the terminal device 120 can also communication data and control information to the network device 110. A link from the network device 110 to the terminal device 120 is referred to as a downlink (DL), while a link from the terminal device 120 to the network device 110 is referred to as an uplink (UL).

The communications in the network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In addition to normal data communications, the network device 110 may send a RS in a broadcast, multi-cast, and/or unicast manners to one or more of the terminal devices 120 in a downlink. Similarly, one or more of the terminal devices 120 may transmit RSs to the network device 110 in an uplink. As used herein, a "downlink (DL)" refers to a link from a network device to a terminal device, while an "uplink (UL)" refers to a link from the terminal device to the network device. Examples of the RS may include but are not limited to downlink or uplink Demodulation Reference Signal (DMRS), Channel State Information-Reference Signal (CSI-RS), Sounding Reference Signal (SRS), Phase Tracking Reference Signal (PTRS), fine time and frequency Tracking Reference Signal (TRS) and so on. For the purpose of discussion without suggesting any limitations, in the following description, some embodiments will be described with reference to DMRS as an example of the RS. However, it is to be understood that embodiments of the present disclosure are also applicable to CSI-RS.

For example, in the case of DL DMRS transmission, a DMRS may be used by the terminal devices 120 for DL channel demodulation. Generally speaking, the DMRS is a signal sequence (also referred to as "DMRS sequence") that is known by both the network device 110 and the terminal devices 120. For example, in DL DMRS transmission, a DMRS sequence may be generated and transmitted by the network device 110 based on a certain rule and the terminal device 120 may deduce the DMRS sequence based on the same rule. Similarly, in the case of UL DMRS transmission, the DMRS may be used by the network device 110 for UL channel demodulation. For example, in UL DMRS transmission, a DMRS sequence may be generated and transmitted by the terminal device 120 based on a certain rule and the network device 110 may deduce the DMRS sequence based on the same rule.

Prior to the UL or DL DMRS transmission, the network device 110 may allocate corresponding resources (also referred to as "DMRS resources") for DMRS transmission and/or specify which DMRS sequence is to be transmitted. In some scenarios, both the network device 110 and the terminal device 120 are equipped with multiple antenna ports and can transmit specified RS sequences with the antenna ports. A set of DMRS resources associated with a number of DMRS ports are also specified. A DMRS port may be referred to as a specific mapping of part or all of a DMRS sequence to one or more resource elements (REs) of a resource region allocated for RS transmission in time, frequency, and/or code domains. In NR, different DMRS ports may be multiplexed based on Code Division Multiplexing (CDM) technology in time and/or frequency domain, and/or based on Frequency Division Multiplexing (FDM) technology. For example, a group of DMRS ports may also referred to as a "DMRS port group" or "DMRS group". A group of DMRS ports multiplexed based on CDM technology can also be referred as a "CDM group".

Figure 2A:
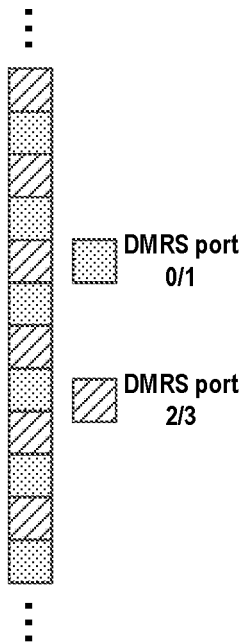
FIGS. 2A-2D shows configuration patterns of different DMRS types according to some embodiments of the present disclosure.
Figure 2B:
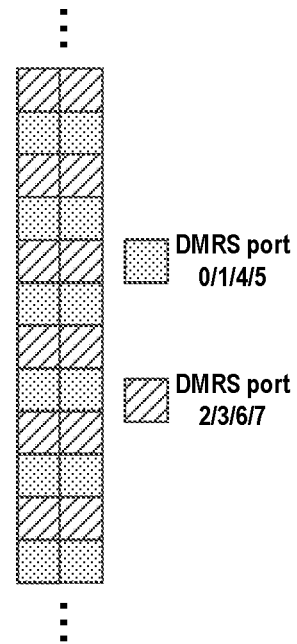
Figure 2C:
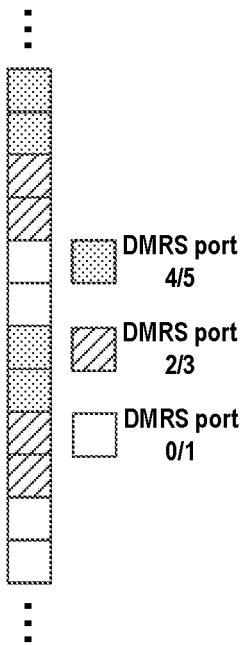
Figure 2D:
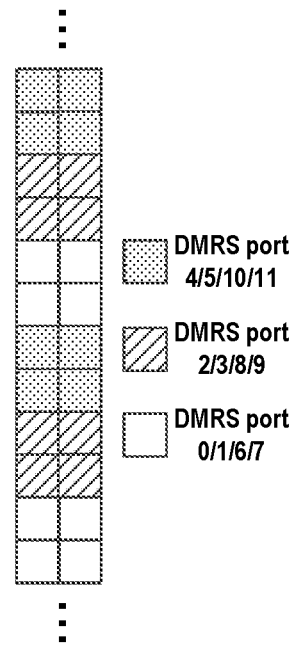

As described above, a DMRS port may belong to one CDM group and occupy several REs within one resource block (RB). For example, as agreed in 3GPP specification works, there are two types (configuration patterns) of DMRS, including DMRS type 1 and DMRS type 2. FIGS. 2A-2D shows configuration patterns of the two different DMRS types. For DMRS type 1, one or two symbols can be supported. As shown in FIG. 2A, for DMRS type 1 associated with one symbol, up to 4 DMRS ports (represented as DMRS ports {0, 1, 2, 3}) can be supported. As shown in FIG. 2B, for DMRS type 1 associated with two symbols, up to 8 DMRS ports (represented as DMRS ports {0, 1, 2, 3, 4, 5, 6, 7}) can be supported. For example, for DMRS type 1, there may be up to two CDM groups. One CDM group may occupy REs with even indices within one RB including 12 REs, for example, REs 0, 2, 4, 6, 8 and 10, where the RE index starts from 0. The other CDM group may occupy REs with odd indices within one RB, for example, REs 1, 3, 5, 7, 9 and 11, where the RE index starts from 0. For DMRS type 2, one or two symbols can be supported. As shown in FIG. 2C, for DMRS type 2 associated with one symbol, up to 6 DMRS ports (represented as DMRS ports {0, 1, 2, 3, 4, 5}) can be supported. As shown in FIG. 2D, for DMRS type 2 associated with two symbols, up to 12 DMRS ports (represented as DMRS ports {0, 1, 2, 3, 4, 5, 6, 7, 8, 9, 10, 11}) can be supported. For example, for DMRS type 2, there may be up to three CDM groups. One CDM group may occupy REs 0, 1, 6 and 7; one CDM group may occupy REs 2, 3, 8 and 9; and one CDM group may occupy REs 4, 5, 10 and 11, where the RE index starts from 0. In FIGS. 2A-2D, different fill patterns may represent different CDM groups.

As agreed in current 3GPP specifications, for UL DMRS transmission in CP-OFDM system, the terminal device 120 may generate the DMRS sequence r(n) as following:

$$r(n) = \frac{1}{\sqrt{2}}(1 - 2 \cdot c(2n)) + j\frac{1}{\sqrt{2}}(1 - 2 \cdot c(2n + 1)) \quad (1)$$

where the pseudo-random sequence c(i) is generated by a pseudo-random sequence generator initialized with:

$$c_{init} = (2^{17}(N_{symb}^{slot} n_{s,f}^{\mu} + l + 1)(2N_{ID}^{nSCID} + 1) + 2N_{ID}^{nSCID} + n_{SCID}) \bmod 2^{31} \quad (2)$$

where l is the OFDM symbol number within the slot and $n_{s,f}^{\mu}$ is the slot number within a frame. The quantity $n_{SCID} \in \{0,1\}$ can be indicated by the DMRS initialization field (if present) in the DCI associated with the PUSCH transmission if DCI format 0_1 is used, otherwise $n_{SCID}=0$. $N_{ID}^{0}$ and/or $N_{ID}^{1}$ may be configured via higher-layer signaling, otherwise $N_{ID}^{nSCID}=N_{ID}^{cell}$.

For DL DMRS transmission in CP-OFDM system, the network device 110 may generate the DMRS sequence r(n) as following:

$$r(n) = \frac{1}{\sqrt{2}}(1 - 2 \cdot c(2n)) + j\frac{1}{\sqrt{2}}(1 - 2 \cdot c(2n + 1)) \quad (3)$$

where the pseudo-random sequence c(i) is generated by a pseudo-random sequence generator initialized with:

$$c_{init} = (2^{17}(N_{symb}^{slot} n_{s,f}^{\mu} + l + 1)(2N_{ID}^{nSCID} + 1) + 2N_{ID}^{nSCID} + n_{SCID}) \bmod 2^{31} \quad (4)$$

where l is the OFDM symbol number within the slot and $n_{s,f}^{\mu}$ is the slot number within a frame. The quantity $n_{SCID} \in \{0,1\}$ can be indicated by the DMRS initialization field (if present) in the DCI associated with the PDSCH transmission if DCI format 1_1 is used, otherwise $n_{SCID}=0$. $N_{ID}^{0}$ and/or $N_{ID}^{1}$ are configured by the higher-layer parameters, otherwise $N_{ID}^{SCID}=N_{ID}^{cell}$.

It can be seen that, according to the current 3GPP specifications, a same DMRS sequence may be mapped to antenna ports across different CDM groups, since DMRS sequences are generated without considering different CDM groups. This may result in a repetition of sequence values in the frequency domain which can translate to a higher PAPR than alternative mappings that would have avoided such repetition.

In order to solve the problems above and one or more of other potential problems, a solution for DMRS transmission is provided in accordance with example embodiments of the present disclosure. This solution will not change the mapping of DMRS ports. Meanwhile, this solution can also provide backward compatibility, low complexity and small impacts on the specifications.

Figures 3, 4:
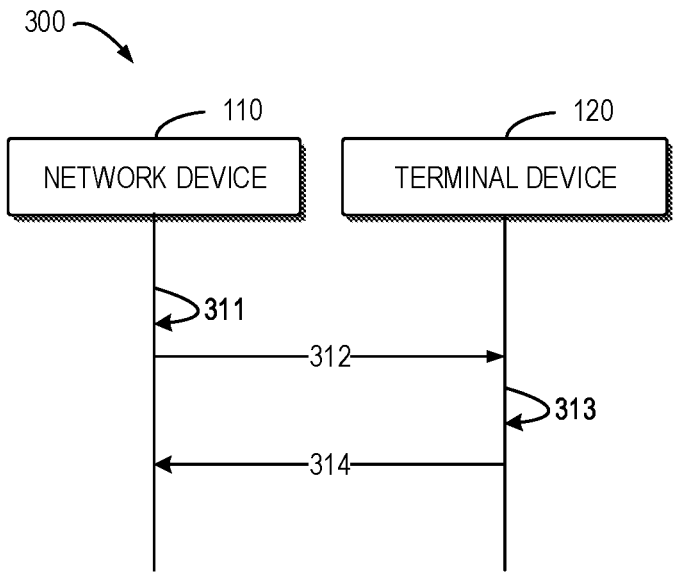
FIG. 3 shows an example process for UL DMRS transmission according to some embodiments of the present disclosure.
FIG. 4 shows an example of an indication of DMRS ports for DMRS type 1.

FIG. 3 shows a process 300 for UL DMRS transmission according to some embodiments of the present disclosure. For the purpose of discussion, the process 300 will be described with reference to FIG. 1. The process 300 may involve the network device 110 and one or more terminal devices 120 served by the network device 110.

As shown in FIG. 3, in some embodiments, the network device 110 may determine (311) configurations for UL DMRS transmissions. The network device 110 may then transmit (312) the determined configurations to the terminal device 120.

In some embodiments, the configurations may also indicate one or more DMRS ports to be used for UL DMRS transmission. In some embodiments, the one or more DMRS ports may be indicated to the terminal device 120 via higher layer signaling (such as Radio Resource Control (RRC) and/or Medium Access Control (MAC) Control Element (CE)) and/or dynamic signaling (such as downlink control information (DCI)). For example, the one or more DMRS ports may be indicated to the terminal device 120 in the DMRS port field of downlink control information (DCI).

In some embodiments, the configurations may also indicate which DMRS sequences are to be transmitted. For example, the configurations may indicate a plurality of parameters related to the generation of DMRS sequences. The plurality of parameters may include but not limited to: the DMRS type, one or more scrambling identities (such as, $N_{ID}^0$ and/or $N_{ID}^1$) for generating DMRS sequences, a DMRS sequence initialization parameter (that is, $n_{SCID}$), indices of CDM groups to be used for UL DMRS transmission, indices of DMRS ports, the number of DMRS ports, a symbol index, a slot index, time domain frequency resources, frequency domain frequency resources, an RE index, an RB index and so on. These parameters can be indicated to the terminal device 120 via higher layer signaling (such as Radio Resource Control (RRC) and/or Medium Access Control (MAC) Control Element (CE)) and/or dynamic signaling (such as downlink control information (DCI)). In particular, for example, the DMRS type and the one or more scrambling identities (such as, $N_{ID}^0$ and/or $N_{ID}^1$) can be indicated to the terminal device 120 via higher layer signaling. The DMRS sequence initialization parameter can be indicated to the terminal device 120 in the DMRS initialization field (if present) in the DCI associated with the PUSCH transmission. The index of a CDM group can be indicated implicitly by the DMRS type and the DMRS ports to be used for UL DMRS transmission. As shown in above FIGS. 2A and 2B, for DMRS type 1, up to two CDM groups can be used. That is, the index of a CDM group can be 0 or 1. For example, CDM group 0 may include some or all of the DMRS ports {0, 1, 4, 5}, and CDM group 1 may include some or all of the DMRS ports {2, 3, 6, 7}. As shown in above FIGS. 2C and 2D, for DMRS type 2, up to three CDM groups can be used. That is, the index of a CDM group can be 0, 1 or 2. For example, CDM group 0 may include some or all of the DMRS ports {0, 1, 6, 7}, CDM group 1 may include some or all of the DMRS ports {2, 3, 8, 9}, and CDM group 2 may include some or all of the DMRS ports {4, 5, 10, 11}.

As shown in FIG. 3, in response to receiving the configurations for UL DMRS transmission, the terminal device 120 may generate (313) one or more DMRS sequences based on the configurations. Then, the terminal device 120 may transmit (314) the generated one or more DMRS sequences to the network device 110. The network device 110 may detect the one or more DMRS sequences transmitted from the terminal device 120 based on the same rule as the generation of the one or more DMRS sequences.

In some embodiments, the terminal device 120 may generate the one or more UL DMRS sequences based on at least one of the following: the number of transmission layers (also referred to as "rank"), the DMRS ports indicated in the DCI, multiplexing types of the DMRS ports, the DMRS type, the one or more scrambling identities (such as, $N_{ID}^0$ and/or $N_{ID}^1$) for generating DMRS sequences, the DMRS sequence initialization parameter (that is, $n_{SCID}$) indicated in the DCI, the indices of the CDM groups to be used for UL DMRS transmission and so on.

In some embodiments, if a set of DMRS ports indicated for one single Physical Uplink Shared Channel (PUSCH) come from different CDM groups, the terminal device 120 may need to transmit DMRSs over the set of indicated DMRS ports at the same time. In some embodiments, the terminal device 120 may need to generate different DMRS sequences for the DMRS ports from different CDM groups, and the terminal device 120 may need to transmit the different DMRS sequences at the same time.

In some embodiments, for DMRS type 1, if the rank is one, there will be no PAPR issue. If the rank is greater than one but the DMRS ports indicated in the DMRS port field of the DCI come from a same CDM group, there will still be no PAPR issue. In this case, the terminal device 120 may not need to generate a DMRS sequence specific to the CDM group. That is, the terminal device 120 may generate the DMRS sequence according to the above formulas (1) and (2), without considering which CDM group is to be used.

Alternatively, in some embodiments, for DMRS type 1, if the rank is greater than one and the DMRS ports indicated in the DMRS port field of the DCI come from different CDM groups, the terminal device 120 may generate different DMRS sequences specific to the different CDM groups. As shown in FIGS. 2A and 2B, for DMRS type 1, there are up to two CDM groups. That is, in this case, the terminal device 120 may need to generate two different DMRS sequences.

FIG. 4 shows an example of the indication field of DMRS ports for DMRS type 1. As shown in FIG. 4, the value '0' or '1' indicates DMRS ports {0, 1}, which come from CDM group 0. The value '2' indicates DMRS ports {2, 3}, which come from CDM group 1. The value '3' indicates DMRS ports {0, 2}, in which DMRS port 0 comes from CDM group 0 and DMRS port 2 comes from CDM group 1. That is, if the value '0', '1' or '2' is indicated to the terminal device 120, the terminal device 120 may generate the DMRS sequence according to the above formulas (1) and (2), without considering which CDM group is to be used. If the value '3' is indicated to the terminal device 120, the terminal device 120 may need to generate two different DMRS sequences for CDM groups 0 and 1 respectively. For example, in FIG. 4, the terminal device 120 may generate a first DMRS sequence for CDM group 0, and transmit the first DMRS sequence over DMRS port 0. The terminal device 120 may generate a second DMRS sequence for CDM group 1, and transmit the second DMRS sequence over DMRS port 1, where the second DMRS sequence is different from the first DMRS sequence.

In some embodiments, for a given DMRS configuration, the values for initializing the DMRS sequence generator (that is, $c_{init}$) may be different for CDM group 0 and CDM group 1. In some embodiments, the given DMRS configuration means that at least the DMRS type, the direction of DMRS transmission (uplink or downlink), the DMRS sequence initialization parameter, the symbol index, the slot index and the RB index are given and configured. In some embodiments, for a given terminal device 120, if the symbol, slot and/or RB for DMRS transmission and the value of DMRS sequence initialization parameter are given and configured, the values of $c_{init}$ may be different for CDM group 0 and CDM group 1.

In some embodiments, for a given DMRS configuration (for example, at least one of the DMRS type, the direction of DMRS transmission (uplink or downlink), the DMRS sequence initialization parameter, the symbol index, the slot index, the RB index is given and configured), a value Y for the DMRS initialization parameter may be indicated to the terminal device 120 in the DMRS sequence initialization field of DCI. In some embodiments, at least for one of the CDM groups, in the formula for calculation of the initialization for DMRS sequence generator ($c_{init}$), the value of index P for the scrambling identity $N_{ID}^P$ and/or the value of quantity $n_{SCID}$ may be different from the value Y. In other words, in the formula for calculation of $c_{init}$, $P \neq Y$ and/or $n_{SCID} \neq Y$. In some embodiments, the value of index P for the scrambling identity $N_{ID}^P$ may be different from the value of quantity $n_{SCID}$. In other words, in the formula for calculation of $c_{init}$, $P \neq n_{SCID}$. In some embodiments, the value of index P for the scrambling identity $N_{ID}^P$ may be different from the value of quantity $n_{SCID}$. Additionally, the value of index P for the scrambling identity $N_{ID}^P$ may be the same as the value Y for the DMRS sequence initialization parameter, or the value of quantity $n_{SCID}$ may be the same as the value Y for the DMRS sequence initialization parameter. In other words, in the formula for calculation of $c_{init}$, $P \neq n_{SCID}$, and ($P=Y$ or $n_{SCID}=Y$).

In some embodiments, the terminal device 120 in the case of UL DMRS transmission (or the network device 110 in the case of DL DMRS transmission) may generate the DMRS sequences by initializing the pseudo-random sequence generator with $c_{init}'$ as following:

$$c_{init}' = (2^{17}(N_{symb}^{slot} n_{s,f}^{\mu} + l + 1)(2N_{ID}^P + 1) + 2N_{ID}^P + n_{SCID}) \mod 2^{31} \quad (5)$$

where l is the OFDM symbol number within the slot and $n_{s,f}^{\mu}$ is the slot number within a frame. $N_{ID}^0$, $N_{ID}^1$ and/or $N_{ID}^2$ are configured by the higher-layer parameters, otherwise $N_{ID}^2 = N_{ID}^{cell}$, $N_{ID}^1 = N_{ID}^{cell}$ and/or $N_{ID}^0 = N_{ID}^{cell}$. As used herein, P is also referred to as a virtual DMRS initialization parameter. In some embodiments, a value Y for the DMRS initialization parameter may be indicated to the terminal device 120 in the DMRS sequence initialization field of DCI. For example, $Y \in \{0,1\}$. In some embodiments, P may be calculated based on the value of Y and/or the CDM group index λ. For example, $P = (Y+\lambda) \mod 2$, where $\lambda \in \{0,1\}$ or $\lambda \in \{0,1,2\}$ which represents the index of a CDM group. In some embodiments, $n_{SCID}$ may be calculated based on the value of Y and/or the CDM group index λ. For example, $n_{SCID} = (Y+\lambda) \mod 2$, where $\lambda \in \{0,1\}$ or $\lambda \in \{0,1,2\}$ which represents the index of a CDM group. In some embodiments, P may be calculated based on the value of $n_{SCID}$ and/or the CDM group index λ. For example, $P = (n_{SCID}+\lambda) \mod 2$, where $\lambda \in \{0,1\}$ or $\lambda \in \{0,1,2\}$ which represents the index of a CDM group. In some embodiments, $n_{SCID}$ may be same as the value of Y. For example, $n_{SCID}=Y$.

In some embodiments, for a given DMRS configuration at a given time (that is, at least one of the DMRS type, the direction of DMRS transmission (uplink or downlink), the DMRS sequence initialization parameter, the symbol index, the slot index or the RB index is the same for different CDM groups), different scrambling identities (such as, $N_{ID}^P$) and/or different values of quantity $n_{SCID}$ may be applied to different CDM groups. In one embodiment, for a given value of DMRS initialization parameter, the scrambling identities for CDM group 0 and CDM group 1 may be different. In other words, for different values of CDM group index λ, the values of P may be different. For example, the scrambling identities $N_{ID}^0$ and $N_{ID}^1$ may be used for calculation of values of $c_{init}'$ for CDM group 0 and CDM group 1 respectively. As another example, the scrambling identities $N_{ID}^0$ and $N_{ID}^{cell}$ may be used for calculation of values of $c_{init}'$ for CDM group 0 and CDM group 1 respectively. As another example, the scrambling identities $N_{ID}^1$ and $N_{ID}^{cell}$ may be used for calculation of values of $c_{init}'$ for CDM group 0 and CDM group 1 respectively. As another example, the scrambling identities $N_{ID}^{cell}$ and $N_{ID}^0$ may be used for calculation of values of $c_{init}'$ for CDM group 0 and CDM group 1 respectively. As another example, the scrambling identities $N_{ID}^{cell}$ and $N_{ID}^1$ may be used for calculation of values of $c_{init}'$ for CDM group 0 and CDM group 1 respectively. As another example, the scrambling identities $N_{ID}^0$ and $N_{ID}^0$ may be used for calculation of values of $c_{init}'$ for CDM group 0 and CDM group 1 respectively. As another example, the scrambling identities $N_{ID}^1$ and $N_{ID}^1$ may be used for calculation of values of $c_{init}'$ for CDM group 0 and CDM group 1 respectively. In some embodiments, the value of $N_{ID}^0$ and $N_{ID}^1$ may be configured via higher layer signaling.

In some embodiments, for different values of DMRS initialization parameter, the scrambling identity associated with at least one of the CDM group, the mapping order of scrambling identities for CDM groups, the value of $n_{SCID}$, or the value of P may be different. For example, if the value of DMRS initialization parameter is 0 (e.g., $Y=0$), the scrambling identities $N_{ID}^0$ and $N_{ID}^1$ may be used for calculation of values of $c_{init}'$ for CDM group 0 and CDM group 1 respectively. If the value of DMRS initialization parameter is 1 (e.g., $Y=1$), the scrambling identities $N_{ID}^3$ and $N_{ID}^4$ may be used for calculation of values of $c_{init}'$ for CDM group 0 and CDM group 1 respectively.

As another example, if the value of DMRS initialization parameter is 0 (e.g., $Y=0$), the scrambling identities $N_{ID}^0$ and $N_{ID}^1$ may be used for calculation of values of $c_{init}'$ for CDM group 0 and CDM group 1 respectively. If the value of DMRS initialization parameter is 1 (e.g., $Y=1$), the scrambling identities $N_{ID}^1$ and $N_{ID}^0$ may be used for calculation of values of $c_{init}'$ for CDM group 0 and CDM group 1 respectively. Alternatively, if the value of DMRS initialization parameter is 1 (e.g., $Y=1$), the scrambling identities $N_{ID}^1$ and $N_{ID}^1$ may be used for calculation of values of $c_{init}'$ for CDM group 0 and CDM group 1 respectively. Alternatively, if the value of DMRS initialization parameter is 1 (e.g., $Y=1$), the scrambling identities $N_{ID}^{cell}$ and $N_{ID}^0$ may be used for calculation of values of $c_{init}'$ for CDM group 0 and CDM group 1 respectively. Alternatively, if the value of DMRS initialization parameter is 1 (e.g., $Y=1$), the scrambling identities $N_{ID}^{cell}$ and $N_{ID}^1$ may be used for calculation of values of $c_{init}'$ for CDM group 0 and CDM group 1 respectively.

As another example, if the value of DMRS initialization parameter is 0 (e.g., $Y=0$), the scrambling identities $N_{ID}^0$ and $N_{ID}^1$ may be used for calculation of values of $c_{init}'$ for CDM group 0 and CDM group 1 respectively. Alternatively, if the value of DMRS initialization parameter is 0 (e.g., $Y=0$), the scrambling identities $N_{ID}^{cell}$ and $N_{ID}^0$ may be used for calculation of values of $c_{init}'$ for CDM group 0 and CDM group 1 respectively. If the value of DMRS initialization parameter is 1 (e.g., $Y=1$), the scrambling identities $N_{ID}^1$ and $N_{ID}^{cell}$ may be used for calculation of values of $c_{init}'$ for CDM group 0 and CDM group 1 respectively. Alternatively, if the value of DMRS initialization parameter is 1 (e.g., $Y=1$), the scrambling identities $N_{ID}^{cell}$ and $N_{ID}^1$ may be used for calculation of values of $c_{init}'$ for CDM group 0 and CDM group 1 respectively.

As another example, if the value of DMRS initialization parameter is 0 (e.g., $Y=0$), the scrambling identities $N_{ID}^0$ and $N_{ID}^0$ may be used for calculation of values of $c_{init}'$ for CDM group 0 and CDM group 1 respectively. If the value of DMRS initialization parameter is 1 (e.g., Y=1), the scrambling identities $N_{ID}^1$ and $N_{ID}^1$ may be used for calculation of values of $c_{init}'$ for CDM group 0 and CDM group 1 respectively.

As another example, if the value of DMRS initialization parameter is 0 (e.g., Y=0), respective quantities $n_{SCID}$ or P used for calculation of respective values of $c_{init}'$ for CDM group 0 and CDM group 1 may be {0, 0}. If the value of DMRS initialization parameter is 1 (e.g., Y=1), respective quantities $n_{SCID}$ or P used for calculation of respective values of $c_{init}'$ for CDM group 0 and CDM group 1 may be 11, 11. As another example, if the value of DMRS initialization parameter is 0 (e.g., Y=0), respective quantities $n_{SCID}$ or P used for calculation of respective values of $c_{init}'$ for CDM group 0 and CDM group 1 may be {0, 1}. If the value of DMRS initialization parameter is 1 (e.g., Y=1), respective quantities $n_{SCID}$ or P used for calculation of respective values of $c_{init}'$ for CDM group 0 and CDM group 1 may be {1, 0}.

As another example, if the value of DMRS initialization parameter is 0 (e.g., Y=0), respective quantities $n_{SCID}$ or P used for calculation of respective values of $c_{init}'$ for CDM group 0 and CDM group 1 may be {0, 0}. If the value of DMRS initialization parameter is 1 (e.g., Y=1), respective quantities $n_{SCID}$ or P used for calculation of respective values of $c_{init}'$ for CDM group 0 and CDM group 1 may be {1, 0}.

In some embodiments, for a given terminal device and/or a given network device, if the DMRS type for UL or DL DMRS transmission, the time and/or RB for DMRS transmission, and the value of DMRS sequence initialization parameter (that is 0 or 1) are given and configured, the value of $c_{init}'$ for CDM group 0 or that for CDM group 1 may be different from the value of $c_{init}$ calculated based on the above formula (2) or (4) with the value of $n_{SCID}$ equals to the indicated value of DMRS sequence initialization parameter. For example, for a given terminal device and/or a given network device, suppose that the DMRS type for UL or DL DMRS transmission and the time and/or RB for DMRS transmission are given and configured, if the DMRS sequence initialization parameter is indicated as 0, the value of $c_{init}'$ for CDM group 0 or that for CDM group 1 may be different from the value of $c_{init}$ calculated based on the above formula (2) or (4) with $n_{SCID}$=0. As another example, for a given terminal device and/or a given network device, suppose that the DMRS type for UL or DL DMRS transmission and the time and/or RB for DMRS transmission are given and configured, if the DMRS sequence initialization parameter is indicated as 1, the value of $c_{init}'$ for CDM group 0 or that for CDM group 1 may be different from the value of $c_{init}$ calculated based on the above formula (2) or (4) with $n_{SCID}$=1.

In some embodiments, for a given terminal device and/or a given network device, if the DMRS type for UL or DL DMRS transmission, the time and/or RB for DMRS transmission, and the value of DMRS sequence initialization parameter (that is 0 or 1) are given and configured the value of $c_{init}'$ for CDM group 0 or that for CDM group 1 may be calculated with a value of $n_{SCID}$ different from the indicated value of DMRS sequence initialization parameter. For example, for a given terminal device and/or a given network device, suppose that the time and/or RB for DMRS transmission are given and configured, if the DMRS sequence initialization parameter is indicated as 0 (e.g., Y=0), the value of $c_{init}'$ for CDM group 0 or that for CDM group 1 may be calculated with $n_{SCID}$=1. As another example, for a given terminal device and/or a given network device, suppose that the time and/or RB for DMRS transmission are given and configured, if the DMRS sequence initialization parameter is indicated as 1 (e.g., Y=1), the value of $c_{init}'$ for CDM group 0 or that for CDM group 1 may be calculated with $n_{SCID}$=0. In some embodiments, the different values of $c_{init}'$ for different CDM groups may be indicated by the DMRS sequence initialization parameter in DCI.

In some embodiments, in the case of UL or DL DMRS transmission, for DMRS type 1 and/or DMRS type 2, the indicated value in the DMRS initialization field of the DCI can be used to indicate different configurations, different mapping order, different combinations, different scrambling identities and/or different values of quantity $n_{SCID} \in \{0,1\}$ for the DMRS sequences for CDM group 0 and CDM group 1. In some embodiments, in the case of UL or DL DMRS transmission, for DMRS type 1 and/or DMRS type 2, the of quantity $n_{SCID} \in \{0,1\}$ for the CDM group 0 and that for CDM group 1 may be different according to the indicated value of DMRS initialization parameter in DMRS initialization field of the DCI. In some embodiments, in the case of UL or DL DMRS transmission, for DMRS type 1 and/or DMRS type 2, the value of quantity $n_{SCID} \in \{0,1\}$ may depend on both the indicated value of DMRS initialization parameter in DMRS initialization field in the DCI and the index of CDM group. In some embodiments, for a given terminal device and/or a given network device, suppose that the DMRS type for UL or DL DMRS transmission and the time and/or RB for DMRS transmission are given and configured, if the value of DMRS sequence initialization parameter is indicated as 0 (e.g., Y=0), the value of $c_{init}'$ for CDM group 0 may be calculated with $n_{SCID}$=0, and the value of $c_{init}'$ for CDM group 1 may be calculated with $n_{SCID}$=1. If the value of DMRS sequence initialization parameter is indicated as 1 (e.g., Y=1), the value of $c_{init}'$ for CDM group 0 may be calculated with $n_{SCID}$=1, and the value of $c_{init}'$ for CDM group 1 may be calculated with $n_{SCID}$=0. Table 1 shows such embodiments. In Table 1, "$c_{init}(n_{SCID})$" represents the value of $c_{init}$ calculated according to the above formula (2) based on $n_{SCID}$.

TABLE 1

| DMRS sequence initialization | $c_{init}'$ |
|---|---|
| 0 | $c_{init}(0)$ with $n_{SCID}$ = 0 and/or $N_{ID}^0$ for DMRS CDM group 0, |
|  | $c_{init}(1)$ with $n_{SCID}$ = 1 and/or $N_{ID}^1$ for DMRS CDM group 1 |
| 1 | $c_{init}(1)$ with $n_{SCID}$ = 1 and/or $N_{ID}^1$ for DMRS CDM group 0, |
|  | $c_{init}(0)$ with $n_{SCID}$ = 0 and/or $N_{ID}^0$ for DMRS CDM group 1 |

In some embodiments, if both $N_{ID}^0$ and $N_{ID}^1$ are configured by the higher-layer parameters, the value of $c_{init}'$ may be calculated according to Table 1. In some embodiments, if only $N_{ID}^0$ is configured by the higher-layer parameters, the value of $c_{init}'$ may be calculated according to Table 1, where $N_{ID}^1 = N_{ID}^{cell}$. In some embodiments, if neither of $N_{ID}^0$ or $N_{ID}^1$ is configured by the higher-layer parameters, the value of $c_{init}'$ may be calculated according to Table 1, where $N_{ID}^0 = N_{ID}^{cell}$ and $N_{ID}^1 = N_{ID}^{cell}$. In other words, in this case, only values of $n_{SCID}$ or P are different for CDM group 0 and CDM group 1 for the calculation of $c_{init}'$.

In some embodiments, the terminal device 120 in the case of UL DMRS transmission (or the network device 110 in the case of DL DMRS transmission) may generate the DMRS sequences by initializing the pseudo-random sequence generator with $c_{init}'$ as any of the following formulas (6.1), (6.2) or (6.3):

$$c_{init}' = (2^{17}(N_{symb}^{slot} n_{s,f}^{\mu} + l + 1)(2N_{ID}^{vSCID} + 1) + 2N_{ID}^{vSCID} + v_{SCID}) \bmod 2^{31} \quad (6.1)$$

$$c_{init}' = (2^{17}(N_{symb}^{slot} n_{s,f}^{\mu} + l + 1)(2N_{ID}^{nSCID} + 1) + 2N_{ID}^{nSCID} + v_{SCID}) \bmod 2^{31} \quad (6.2)$$

$$c_{init}' = (2^{17}(N_{symb}^{slot} n_{s,f}^{\mu} + l + 1)(2N_{ID}^{vSCID} + 1) + 2N_{ID}^{vSCID} + n_{SCID}) \bmod 2^{31} \quad (6.3)$$

where $v_{SCID} = (n_{SCID} + \lambda) \bmod 2$, and $\lambda \in \{0,1\}$ represents the index of a CDM group. In addition, l is the OFDM symbol number within the slot and $n_{s,f}^{\mu}$ is the slot number within a frame. The value of quantity $n_{SCID} \in \{0,1\}$ can be indicated by the DMRS initialization field (if present) in the DCI, otherwise $n_{SCID} = 0$. As used herein, $v_{SCID}$ is also referred to as a virtual DMRS initialization parameter. In this case, the value of quantity $n_{SCID}$ n equals to the value indicated by the DMRS initialization field (if present). $N_{ID}^0$ and/or $N_{ID}^1$ are configured by the higher-layer parameters, otherwise $N_{ID}^1 = N_{ID}^{cell}$ and/or $N_{ID}^0 = N_{ID}^{cell}$.

In some embodiments, for DMRS type 2, there are up to three CDM groups. For a given DMRS configuration at a given time (that is, at least one of the direction of DMRS transmission (uplink or downlink), the DMRS sequence initialization parameter, the symbol index, the slot index or the RB index is the same for different CDM groups), different scrambling identities (such as, $N_{ID}^P$) and/or different values of quantity $n_{SCID}$ may be applied to different CDM groups. In one embodiment, for a given value of DMRS initialization parameter, the scrambling identities for at least two of CDM group 0, CDM group 1 and CDM group 2 may be different. In other words, for different values of CDM group index $\lambda$, the values of P may be different. For example, the scrambling identities $N_{ID}^0$, $N_{ID}^1$ and $N_{ID}^2$ may be used for calculation of values of $c_{init}'$ for CDM group 0, CDM group 1 and CDM group 2 respectively. As another example, the scrambling identities $N_{ID}^1$, $N_{ID}^0$ and $N_{ID}^2$ may be used for calculation of values of $c_{init}'$ for CDM group 0, CDM group 1 and CDM group 2 respectively. As another example, the scrambling identities $N_{ID}^0$, $N_{ID}^1$ and $N_{ID}^{cell}$ may be used for calculation of values of $c_{init}'$ for CDM group 0, CDM group 1 and CDM group 2 respectively. As another example, the scrambling identities $N_{ID}^1$, $N_{ID}^0$ and $N_{ID}^{cell}$ may be used for calculation of values of $c_{init}'$ for CDM group 0, CDM group 1 and CDM group 2 respectively. As another example, the scrambling identities $N_{ID}^{cell}$, $N_{ID}^1$ and $N_{ID}^0$ may be used for calculation of values of $c_{init}'$ for CDM group 0, CDM group 1 and CDM group 2 respectively. As another example, the scrambling identities $N_{ID}^{cell}$, $N_{ID}^1$ and $N_{ID}^0$ may be used for calculation of values of $c_{init}'$ for CDM group 0, CDM group 1 and CDM group 2 respectively. As another example, the scrambling identities $N_{ID}^0$, $N_{ID}^{cell}$ and $N_{ID}^1$ may be used for calculation of values of $c_{init}'$ for CDM group 0, CDM group 1 and CDM group 2 respectively. As another example, the scrambling identities $N_{ID}^1$, $N_{ID}^{cell}$ and $N_{ID}^0$ may be used for calculation of values of $c_{init}'$ for CDM group 0, CDM group 1 and CDM group 2 respectively. In some embodiments, the value of $N_{ID}^0$, $N_{ID}^1$ and/or $N_{ID}^2$ may be configured via higher layer signaling.

In some embodiments, for different values of DMRS initialization parameter, the scrambling identity associated with at least one of the CDM group, the mapping order of scrambling identities for CDM groups, the value of $n_{SCID}$ or the value of $v_{SCID}$ may be different. For example, if the value of DMRS initialization parameter is 0 (e.g., Y=0), the scrambling identities $N_{ID}^0$, $N_{ID}^1$ and $N_{ID}^2$ may be used for calculation of values of $c_{init}'$ for CDM group 0, CDM group 1 and CDM group 2 respectively. If the value of DMRS initialization parameter is 1 (e.g, Y=1), the scrambling identities $N_{ID}^3$, $N_{ID}^4$ and $N_{ID}^5$ may be used for calculation of values of $c_{init}'$ for CDM group 0, CDM group 1 and CDM group 2 respectively.

As another example, if the value of DMRS initialization parameter is 0 (e.g., Y=0), the scrambling identities $N_{ID}^0$, $N_{ID}^1$ and $N_{ID}^2$ may be used for calculation of values of $c_{init}'$ for CDM group 0, CDM group 1 and CDM group 2 respectively. If the value of DMRS initialization parameter is 1 (e.g., Y=1), the scrambling identities $N_{ID}^1$, $N_{ID}^0$ and $N_{ID}^3$ may be used for calculation of values of $c_{init}'$ for CDM group 0, CDM group 1 and CDM group 2 respectively. Alternatively, if the value of DMRS initialization parameter is 1 (e.g., Y=1), the scrambling identities $N_{ID}^1$, $N_{ID}^0$ and $N_{ID}^2$ may be used for calculation of values of $c_{init}'$ for CDM group 0, CDM group 1 and CDM group 2 respectively. Alternatively, if the value of DMRS initialization parameter is 1 (e.g., Y=1), the scrambling identities $N_{ID}^2$, $N_{ID}^0$ and $N_{ID}^1$ may be used for calculation of values of $c_{init}'$ for CDM group 0, CDM group 1 and CDM group 2 respectively. Alternatively, if the value of DMRS initialization parameter is 1 (e.g., Y=1), the scrambling identities $N_{ID}^1$, $N_{ID}^2$ and $N_{ID}^0$ may be used for calculation of values of $c_{init}'$ for CDM group 0, CDM group 1 and CDM group 2 respectively.

As another example, if the value of DMRS initialization parameter is 0 (e.g., Y=0), the scrambling identities $N_{ID}^0$, $N_{ID}^1$ and $N_{ID}^{cell}$ may be used for calculation of values of $c_{init}'$ for CDM group 0, CDM group 1 and CDM group 2 respectively. Alternatively, if the value of DMRS initialization parameter is 0 (e.g., Y=0), the scrambling identities $N_{ID}^{cell}$, $N_{ID}^0$ and $N_{ID}^1$ may be used for calculation of values of $c_{init}'$ for CDM group 0, CDM group 1 and CDM group 2 respectively. Alternatively, if the value of DMRS initialization parameter is 0 (e.g., Y=0), the scrambling identities $N_{ID}^0$, $N_{ID}^1$ and $N_{ID}^2$ may be used for calculation of values of $c_{init}'$ for CDM group 0, CDM group 1 and CDM group 2 respectively. Alternatively, if the value of DMRS initialization parameter is 0 (e.g., Y=0), the scrambling identities $N_{ID}^0$, $N_{ID}^0$ and $N_{ID}^{cell}$ may be used for calculation of values of $c_{init}'$ for CDM group 0, CDM group 1 and CDM group 2 respectively. If the value of DMRS initialization parameter is 1 (e.g., Y=1), the scrambling identities $N_{ID}^1$, $N_{ID}^0$ and $N_{ID}^{cell}$ may be used for calculation of values of $c_{init}'$ for CDM group 0, CDM group 1 and CDM group 2 respectively. Alternatively, if the value of DMRS initialization parameter is 1 (e.g., Y=1), the scrambling identities $N_{ID}^0$, $N_{ID}^1$ and $N_{ID}^{cell}$ may be used for calculation of values of $c_{init}'$ for CDM group 0, CDM group 1 and CDM group 2 respectively. Alternatively, if the value of DMRS initialization parameter is 1 (e.g., Y=1), the scrambling identities $N_{ID}^1$, $N_{ID}^1$ and $N_{ID}^{cell}$ may be used for calculation of values of $c_{init}'$ for CDM group 0, CDM group 1 and CDM group 2 respectively. Alternatively, if the value of DMRS initialization parameter is 1 (e.g., Y=1), the scrambling identities $N_{ID}^{cell}$, $N_{ID}^0$ and $N_{ID}^1$ may be used for calculation of values of $c_{init}'$ for CDM group 0, CDM group 1 and CDM group 2 respectively. Alternatively, if the value of DMRS initialization parameter is 1 (e.g., Y=1), the scrambling identities $N_{ID}^{cell}$, $N_{ID}^1$ and $N_{ID}^1$ may be used for calculation of values of $c_{init}'$ for CDM group 0, CDM group 1 and CDM group 2 respectively.

As another example, if the value of DMRS initialization parameter is 0 (e.g., Y=0), the scrambling identities $N_{ID}^0$, $N_{ID}^1$ and $N_{ID}^0$ may be used for calculation of values of $c_{init}'$ for CDM group 0, CDM group 1 and CDM group 2 respectively. If the value of DMRS initialization parameter is 1 (e.g., Y=1), the scrambling identities $N_{ID}^1$, $N_{ID}^0$ and $N_{ID}^1$ may be used for calculation of values of $c_{init}'$ for CDM group 0, CDM group 1 and CDM group 2 respectively.

As another example, if the value of DMRS initialization parameter is 0, respective quantities $n_{SCID}$ or $v_{SCID}$ used for calculation of values of $c_{init}'$ for CDM group 0, CDM group 1 and CDM group 2 may be {0, 0, 0}. If the value of DMRS initialization parameter is 1 (e.g., Y=1), respective quantities $n_{SCID}$ or $v_{SCID}$ used for calculation of values of $c_{init}'$ for CDM group 0, CDM group 1 and CDM group 2 may be 11, 1, 11.

As another example, if the value of DMRS initialization parameter is 0 (e.g., Y=0), respective quantities $n_{SCID}$ or $v_{SCID}$ used for calculation of values of $c_{init}'$ for CDM group 0, CDM group 1 and CDM group 2 respectively may be {0, 1, 0}. If the value of DMRS initialization parameter is 1 (e.g., Y=1), respective quantities $n_{SCID}$ or $v_{SCID}$ used for calculation of values of $c_{init}'$ for CDM group 0, CDM group 1 and CDM group 2 respectively may be 11, 0, 11.

As another example, if the value of DMRS initialization parameter is 0 (e.g., Y=0), respective quantities $n_{SCID}$ or $v_{SCID}$ used for calculation of values of $c_{init}'$ for CDM group 0, CDM group 1 and CDM group 2 respectively may be {0, 1, 1}. If the value of DMRS initialization parameter is 1 (e.g., Y=1), respective quantities $n_{SCID}$ or $v_{SCID}$ used for calculation of values of $c_{init}'$ for CDM group 0, CDM group 1 and CDM group 2 respectively may be {1, 0, 0}.

In some embodiments, the modified initialization schemes for DMRS sequence generation according to some embodiments of the present disclosure may be different for UL DMRS transmission and DL DMRS transmission.

In some embodiments, for DL DMRS transmission, if modified initialization scheme for DMRS sequence generation according to some embodiments of the present disclosure is configured, the modified initialization scheme may be used for all DMRS indications in antenna ports configurations. For example, the modified initialization scheme may be used no matter when single DMRS port or multiple DMRS ports are configured, and/or no matter when the DMRS ports are from same CDM group or different CDM groups. Specifically, the modified initialization scheme may be the same as the formulas (3) and (4) when the DMRS port(s) are from CDM group 0 and the number of DMRS CDM group(s) without data is 1. In other words, the modified initialization scheme may not be used when the DMRS port(s) are from CDM group 0 and the number of DMRS CDM group(s) without data is 1.

In some embodiments, for UL DMRS transmission, if modified initialization scheme for DMRS sequence generation according to some embodiments of the present disclosure is configured, the modified initialization scheme may be used for a subset of DMRS indications in antenna ports configurations. For example, for one PUSCH scheduling, the modified initialization scheme may be used only when the rank is larger than 1 and/or when the indicated DMRS ports are from different CDM groups. In some embodiments, for one PUSCH scheduling, when the rank is 1 and/or the indicated DMRS ports are from same CDM group, the modified initialization scheme may not be used. In other words, the formulas (1) and (2) may be used when the rank is 1 and/or the indicated DMRS ports are from same CDM group.

In some embodiments, in the case of UL DMRS transmission for DMRS type 1, if the rank is greater than one and the DMRS ports indicated in the DMRS port field of the DCI come from different CDM groups, the indicated value in the DMRS initialization field of the DCI can be used to indicate different configurations, different mapping order, different combinations, different scrambling identities and/or different values of quantity $n_{SCID} \in \{0,1\}$ for the two DMRS sequences for CDM group 0 and CDM group 1. For example, the terminal device 120 may generate the DMRS sequences by initializing the pseudo-random sequence generator with $c_{init}'$ according to the formula (6.1) or (6.2) or (6.3) or according to Table 1.

In some embodiments, in the case of UL DMRS transmission for DMRS type 2, at a given time and for a single PUSCH scheduled for a single terminal device, if the DMRS ports indicated in the DMRS port field of the DCI come from a same CDM group and/or the rank is 1 and/or only one DMRS port is indicated, there will be no PAPR issue. In this case, the terminal device 120 may not need to generate a DMRS sequence specific to the CDM group. That is, the terminal device 120 may generate the DMRS sequence according to the above formulas (1) and (2), without considering which CDM group is to be used.

Alternatively, in some embodiments, in the case of UL DMRS transmission for DMRS type 2, at a given time and for a single PUSCH scheduled for a single terminal device, if the DMRS ports indicated in the DMRS port field of the DCI come from different CDM groups, the terminal device 120 may generate different DMRS sequences specific to the different CDM groups. As shown in FIGS. 2C and 2D, for DMRS type 2, there are up to three CDM groups. However, for a given terminal device 120, the indicated DMRS ports may come from up to two of the three CDM groups. That is, in this case, the terminal device 120 may need to generate at most two different DMRS sequences at a time.

Figures 5, 6:
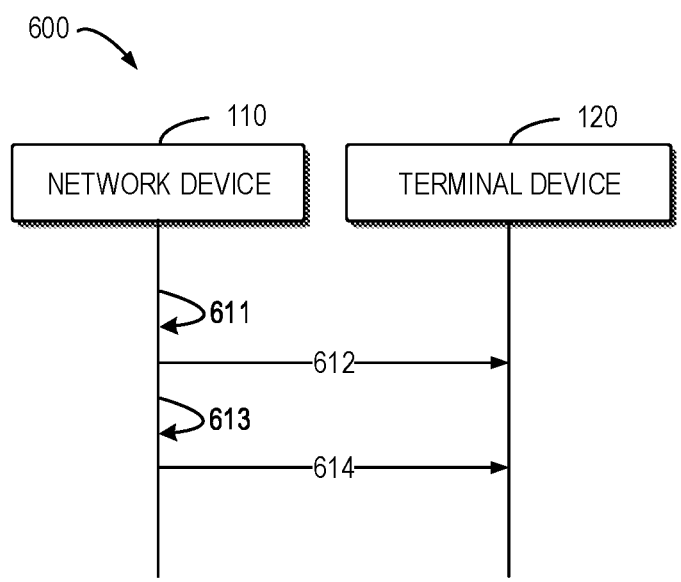
FIG. 5 shows an example of an indication of DMRS ports for DMRS type 2.
FIG. 6 shows an example process for UL DMRS transmission according to some embodiments of the present disclosure.

FIG. 5 shows an example of the indication field of DMRS ports for DMRS type 2. As shown in FIG. 5, the value '0' or '1' indicates DMRS ports 0-2, in which DMRS ports 0-1 come from CDM group 0 and DMRS port 2 comes from CDM group 1. The value '2' indicates DMRS ports 3-5, in which DMRS port 3 comes from CDM group 1 and DMRS ports 4-5 come from CDM group 2. The value '3' indicates DMRS ports {0, 1, 6}, which come from CDM group 0. The value '4' indicates DMRS ports {2, 3, 8}, which come from CDM group 1. The value '5' indicates DMRS ports {4, 5, 10}, which come from CDM group 2. That is, if the value '3', '4' or '5' is indicated to the terminal device 120, the terminal device 120 may generate the DMRS sequence according to the above formulas (1) and (2), without considering which CDM group is to be used. If the value '0', '1' or '2' is indicated to the terminal device 120, the terminal device 120 may need to generate two DMRS sequences for the two different CDM group.

For example, in FIG. 5, if the value '0' or '1' is indicated to the terminal device 120, the terminal device 120 may generate a first DMRS sequence for CDM group 0, and transmit the first DMRS sequence over DMRS ports 0 and/or 1. The terminal device 120 may also generate a second DMRS sequence for CDM group 1, and transmit the second DMRS sequence over DMRS port 2, where the second DMRS sequence is different from the first DMRS sequence. Alternative, if the value '2' is indicated to the terminal device 120, the terminal device 120 may generate a third DMRS sequence for CDM group 1, and transmit the third DMRS sequence over DMRS port 3. The terminal device 120 may also generate a fourth DMRS sequence for CDM group 2, and transmit the fourth DMRS sequence over DMRS ports 4 and/or 5, where the fourth DMRS sequence is different from the third DMRS sequence. In some embodiments, the third DMRS sequence may be the same as the second DMRS sequence, while the fourth DMRS sequence may be the same as the first DMRS sequence.

In some embodiments, in the case of UL DMRS transmission for DMRS type 2, if the DMRS ports indicated in the DMRS port field of the DCI come from different CDM groups, the indicated value in the DMRS initialization field of the DCI can be used to indicate different configurations and/or different mapping order and/or different combinations and/or different scrambling identities and/or different values of quantity $n_{SCID} \in \{0,1\}$ for different DMRS sequences for different CDM groups. Table 2 shows such embodiments. In Table 2, "$c_{init}(n_{init})$" represents the value of $c_{init}$ calculated according to the formula (2) based on $n_{SCID}$.

TABLE 2

| DMRS sequence initialization | $c_{init}'$ |
|---|---|
| 0 | If CDM groups 0 and 1 are scheduled for one PUSCH, $c_{init}(0)$ with $n_{SCID} = 0$ and/or $N_{ID}^0$ for DMRS CDM group 0, $c_{init}(1)$ with $n_{SCID} = 1$ and/or $N_{ID}^1$ for DMRS CDM group 1 If CDM groups 1 and 2 are scheduled for one PUSCH, $c_{init}(1)$ with $n_{SCID} = 1$ and/or $N_{ID}^1$ for DMRS CDM group 1, $c_{init}(0)$ with $n_{SCID} = 0$ and/or $N_{ID}^0$ for DMRS CDM group 2 |
| 1 | If CDM groups 0 and 1 are scheduled for one PUSCH, $c_{init}(1)$ with $n_{SCID} = 1$ and/or $N_{ID}^1$ for DMRS CDM group 0, $c_{init}(0)$ with $n_{SCID} = 0$ and/or $N_{ID}^0$ for DMRS CDM group 1 If CDM groups 1 and 2 are scheduled for one PUSCH, $c_{init}(0)$ with $n_{SCID} = 0$ and/or $N_{ID}^0$ for DMRS CDM group 1, $c_{init}(1)$ with $n_{SCID} = 1$ and/or $N_{ID}^1$ for DMRS CDM group 2 |

In some embodiments, if both $N_{ID}^0$ and $N_{ID}^1$ are configured by the higher-layer parameters, the value of $c_{init}'$ may be calculated according to Table 2. In some embodiments, if only $N_{ID}^0$ is configured by the higher-layer parameters, the value of $c_{init}'$ may be calculated according to Table 2, where $N_{ID}^1 = N_{ID}^{cell}$. In some embodiments, if neither of $N_{ID}^0$ or $N_{ID}^1$ is configured by the higher-layer parameters, the value of $c_{init}'$ may be calculated according to Table 2, where $N_{ID}^0 = N_{ID}^{cell}$ and with $N_{ID}^1 = N_{ID}^{cell}$. In other words, in this case, only values of $n_{SCID}$ or $v_{SCID}$ are different for the calculation of values of $c_{init}'$ for CDM group 0 and/or CDM group 1 and/or CDM group 2.

In some embodiments, in the case of UL DMRS transmission, the terminal device 120 may generate the DMRS sequences by initializing the pseudo-random sequence generator with $c_{init}'$ as any of the following formulas (7.1), (7.2) or (7.3):

$$c_{init}' = (2^{17}(N_{symb}^{slot} n_{s,f}^{\mu} + l + 1)(2N_{ID}^{vSCID} + 1) + 2N_{ID}^{vSCID} + v_{SCID}) \bmod 2^{31} \quad (7.1)$$

$$c_{init}' = (2^{17}(N_{symb}^{slot} n_{s,f}^{\mu} + l + 1)(2N_{ID}^{nSCID} + 1) + 2N_{ID}^{nSCID} + v_{SCID}) \bmod 2^{31} \quad (7.2)$$

$$c_{init}' = (2^{17}(N_{symb}^{slot} n_{s,f}^{\mu} + l + 1)(2N_{ID}^{vSCID} + 1) + 2N_{ID}^{vSCID} + n_{SCID}) \bmod 2^{31} \quad (7.3)$$

where $v_{SCID} = n_{SCID} + \lambda) \bmod 2$, and $\lambda \in \{0,1,2\}$ represents the index of a CDM group. In addition, l is the OFDM symbol number within the slot and $n_{s,f}^{\mu}$ is the slot number within a frame. The value of quantity $n_{SCID} \in \{0,1\}$ can be indicated by the DMRS initialization field (if present) in the DCI, otherwise $n_{SCID} = 0$. As used herein, $v_{SCID}$ is also referred to as a virtual DMRS initialization parameter. In this case, the value of quantity $n_{SCID}$ equals to the value indicated by the DMRS initialization field (if present). $N_{ID}^0$ and/or $N_{ID}^1$ are configured by the higher-layer parameters, otherwise $N_{ID}^1 = N_{ID}^{cell}$ and/or $N_{ID}^0 = N_{ID}^{cell}$.

FIG. 6 shows a process 600 for DL DMRS transmission according to some embodiments of the present disclosure. For the purpose of discussion, the process 600 will be described with reference to FIG. 1. The process 600 may involve the network device 110 and one or more terminal devices 120 served by the network device 110.

As shown in FIG. 6, in some embodiments, the network device 110 may determine (611) configurations for DL DMRS transmissions. The network device 110 may then transmit (612) the determined configurations to the terminal device 120.

In some embodiments, the configurations may also indicate one or more DMRS ports to be used for DL DMRS transmission. In some embodiments, the one or more DMRS ports may be indicated to the terminal device 120 via higher layer signaling (such as Radio Resource Control (RRC) and/or Medium Access Control (MAC) Control Element (CE)) and/or dynamic signaling (such as downlink control information (DCI)). For example, the one or more DMRS ports may be indicated to the terminal device 120 in the DMRS port field of downlink control information (DCI).

In some embodiments, the configurations may also indicate which DMRS sequences are to be transmitted. For example, the configurations may indicate a plurality of parameters related to the generation of DMRS sequences. The plurality of parameters may include but not limited to: the DMRS type, one or more scrambling identities (such as, $N_{ID}^0$ and/or $N_{ID}^1$) for generating DMRS sequences, a DMRS sequence initialization parameter (that is, $n_{SCID}$), indices of CDM groups to be used for DL DMRS transmission, indices of DMRS ports, the number of DMRS ports, a symbol index, a slot index, time domain frequency resources, frequency domain frequency resources, an RE index, an RB index and so on. These parameters can be indicated to the terminal device 120 via higher layer signaling (such as Radio Resource Control (RRC) and/or Medium Access Control (MAC) Control Element (CE)) and/or dynamic signaling (such as downlink control information (DCI)). In particular, for example, the DMRS type and the one or more scrambling identities (such as, $N_{ID}^0$ and/or $N_{ID}^1$) can be indicated to the terminal device 120 via higher layer signaling. The DMRS sequence initialization parameter can be indicated to the terminal device 120 in the DMRS initialization field (if present) in the DCI associated with the PUSCH transmission. The index of a CDM group can be indicated implicitly by the DMRS type and the DMRS ports to be used for DL DMRS transmission. As shown in above FIGS. 2A and 2B, for DMRS type 1, up to two CDM groups can be used. That is, the index of a CDM group can be 0 or 1. For example, CDM group 0 may include some or all of the DMRS ports {0, 1, 4, 5}, and CDM group 1 may include some or all of the DMRS ports {2, 3, 6, 7}. As shown in above FIGS. 2C and 2D, for DMRS type 2, up to three CDM groups can be used. That is, the index of a CDM group can be 0, 1 or 2. For example, CDM group 0 may include some or all of the DMRS ports {0, 1, 6, 7}, CDM group 1 may include some or all of the DMRS ports {2, 3, 8, 9}, and CDM group 2 may include some or all of the DMRS ports {4, 5, 10, 11}.

As shown in FIG. 6, in response to the configurations for DL DMRS transmission being transmitted to the terminal device 120, the network device 110 may generate (613) one or more DMRS sequences based on the configurations. Then, the network device 110 may transmit (614) the generated one or more DMRS sequences to the terminal device 120. The terminal device 120 may detect the one or more DMRS sequences transmitted from the network device 110 based on the same rule as the generation of the one or more DMRS sequences.

In some embodiments, the network device 110 may generate the one or more DMRS sequences based on at least one of the following: the number of transmission layers (also referred to as "rank"), the DMRS ports indicated in the DCI, multiplexing types of the DMRS ports, the DMRS type, the one or more scrambling identities (such as, $N_{ID}^0$ and/or $N_{ID}^1$) for generating DMRS sequences, the DMRS sequence initialization parameter (that is, $n_{SCID}$) indicated in the DCI, the indices of the CDM groups to be used for DL DMRS transmission and so on.

In some embodiments, for DL DMRS transmission, CDM group specific sequences are needed even if DMRS ports configured to a given terminal device all come from a same CDM group. In some embodiments, as shown in FIGS. 2A and 2B, for DMRS type 1, there are up to two CDM groups. That is, for DMRS type 1, the network device 110 may need to generate two different DMRS sequences for the two CDM groups. In some embodiments, the value of quantity $n_{SCID} \in \{0,1\}$ may depend on both the indicated value of DMRS initialization parameter in DMRS initialization field in the DCI and the index of CDM group. Table 3 shows such embodiments. In Table 3, "$c_{init}(n_{SCID})$" represents the value of $c_{init}$ calculated according to the formula (4) based on $n_{SCID}$. It can be seen that Table 3 is the same as Table 1.

TABLE 3

| DMRS sequence initialization | $c_{init}'$ |
|---|---|
| 0 | $c_{init}(0)$ with $n_{SCID}$ = 0 and/or $N_{ID}^0$ for DMRS CDM group 0, $c_{init}(1)$ with $n_{SCID}$ = 1 and/or $N_{ID}^1$ for DMRS CDM group 1 |
| 1 | $c_{init}(1)$ with $n_{SCID}$ = 1 and/or $N_{ID}^1$ for DMRS CDM group 0, $c_{init}(0)$ with $n_{SCID}$ = 0 and/or $N_{ID}^0$ for DMRS CDM group 1 |

In some embodiments, if both $N_{ID}^0$ and $N_{ID}^1$ are configured by the higher-layer parameters, the value of $c_{init}'$ may be calculated according to Table 3. In some embodiments, if only $N_{ID}^0$ is configured by the higher-layer parameters, the value of $c_{init}'$ may be calculated according to Table 3, where $N_{ID}^1 = N_{ID}^{cell}$. In some embodiments, if neither of $N_{ID}^0$ or $N_{ID}^1$ is configured by the higher-layer parameters, the value of $c_{init}'$ may be calculated according to Table 3, where $N_{ID}^0 = N_{ID}^{cell}$ and $N_{ID}^1 = N_{ID}^{cell}$. In other words, in this case, only values of $n_{SCID}$ or $v_{SCID}$ are different for the calculation of values of $c_{init}'$ for CDM group 0 and CDM group 1.

In some embodiments, the terminal device 120 in the case of UL DMRS transmission or the network device 110 in the case of DL DMRS transmission may generate the DMRS sequences by initializing the pseudo-random sequence generator with $c_{init}'$ as any of the following formulas (8.1), (8.2) or (8.3):

$$c_{init}' = (2^{17}(N_{symb}^{slot} n_{s,f}^\mu + l + 1)(2N_{ID}^{vSCID} + 1) + 2N_{ID}^{vSCID} + v_{SCID}) \bmod 2^{31} \quad (8.1)$$

$$c_{init}' = (2^{17}(N_{symb}^{slot} n_{s,f}^\mu + l + 1)(2N_{ID}^{nSCID} + 1) + 2N_{ID}^{nSCID} + v_{SCID}) \bmod 2^{31} \quad (8.2)$$

$$c_{init}' = (2^{17}(N_{symb}^{slot} n_{s,f}^\mu + l + 1)(2N_{ID}^{vSCID} + 1) + 2N_{ID}^{vSCID} + n_{SCID}) \bmod 2^{31} \quad (8.2)$$

where $v_{SCID} = (n_{SCID} + \lambda) \bmod 2$, and $\lambda \in \{0,1\}$ represents the index of a CDM group. In addition, l is the OFDM symbol number within the slot and $n_{s,f}^\mu$ is the slot number within a frame. The value of quantity $n_{SCID} \in \{0,1\}$ can be indicated by the DMRS initialization field (if present) in the DCI, otherwise $n_{SCID} = 0$. As used herein, $v_{SCID}$ is also referred to as a virtual DMRS initialization parameter. In this case, the value of quantity $n_{SCID}$ equals to the value indicated by the DMRS initialization field (if present). $N_{ID}^0$ and/or $N_{ID}^1$ are configured by the higher-layer parameters, otherwise $N_{ID}^1 = N_{ID}^{cell}$ and/or $N_{ID}^0 = N_{ID}^{cell}$.

In some embodiments, for DL and/or UL DMRS transmission, CDM group specific sequences are needed even if DMRS ports configured to a given terminal device all come from a same CDM group. In some embodiments, as shown in FIGS. 2C and 2D, for DMRS type 2, there are up to three CDM groups. In some embodiments, for CDM group 0 and CDM group 1, the quantity $n_{SCID} \in \{0,1\}$ indicated in the DMRS initialization field of the DCI can be used to indicate two different DMRS sequences. In addition, for CDM group 2, a further scrambling identity (such as, $N_{ID}^2$) in addition to $N_{ID}^0$ and/or $N_{ID}^1$ may be needed to indicate the DMRS sequence. For example, the further scrambling identity $N_{ID}^2$ may be configured to the terminal device 120 via higher layer signaling together with the scrambling identities $N_{ID}^0$ and/or $N_{ID}^1$. In some embodiments, the network device 110 and/or the terminal device 120 may generate the DMRS sequences by initializing the pseudo-random sequence generator with $c_{init}'$ according to Table 4. In Table 4, "$c_{init}(X)$" represents the value of $c_{init}$ calculated according to the formula (4) based on $n_{SCID}$ and $N_{ID}^X$.

TABLE 4

| DMRS sequence initialization | $c_{init}'$ |
|---|---|
| 0 | $c_{init}(0)$ with $n_{SCID}$ = 0 and $N_{ID}^0$ for DMRS CDM group 0, $c_{init}(1)$ with $n_{SCID}$ = 1 and $N_{ID}^1$ for DMRS CDM group 1, $c_{init}(0)$ with $n_{SCID}$ = 0 and $N_{ID}^0$ for DMRS CDM group 2. |
| 1 | $c_{init}(1)$ with $n_{SCID}$ = 1 and $N_{ID}^1$ for DMRS CDM group 0, $c_{init}(0)$ with $n_{SCID}$ = 0 and $N_{ID}^0$ for DMRS CDM group 1, $c_{init}(2)$ with $n_{SCID}$ = 1 and $N_{ID}^2$ for DMRS CDM group 2. |

In some embodiments, if all of $N_{ID}^0$, $N_{ID}^1$ and $N_{ID}^2$ are configured by the higher-layer parameters, the value of $c_{init}'$ may be calculated according to Table 4. In some embodiments, if only $N_{ID}^0$ and $N_{ID}^1$ are configured by the higher-layer parameters, the value of $c_{init}'$ may be calculated according to Table 4, and $N_{ID}^2 = N_{ID}^{cell}$. In some embodiments, if none of $N_{ID}^0$, $N_{ID}^1$ and $N_{ID}^2$ is configured by the higher-layer parameters, the value of $c_{init}'$ may be calculated according to Table 4, where $N_{ID}^0 = N_{ID}^{cell}$ and $N_{ID}^1 = N_{ID}^{cell}$, and $N_{ID}^2 = N_{ID}^{cell}$. In other words, in this case, only values of $n_{SCID}$ or $v_{SCID}$ are different for the calculation of values of $c_{init}'$ for CDM group 0, CDM group 1 and CDM group 2.

In some embodiments, the terminal device 120 in the case of UL DMRS transmission or the network device 110 in the case of DL DMRS transmission may generate the DMRS sequences by initializing the pseudo-random sequence generator with $c_{init}'$ as following:

$$c_{init}' = \begin{cases} \left(2^{17}\left(N_{symb}^{slot}n_{s,f}^{\mu}+l+1\right)\left(2N_{ID}^{v_{SCID}}+1\right)+ \\ 2N_{ID}^{v_{SCID}}+v_{SCID}\right)\mod 2^{31}, & \text{if } \lambda = 0 \text{ or } 1 \\ \left(2^{17}\left(N_{symb}^{slot}n_{s,f}^{\mu}+l+1\right)\left(2N_{ID}^{2\cdot n_{SCID}}+1\right)+ \\ 2N_{ID}^{2\cdot n_{SCID}}+n_{SCID}\right)\mod 2^{31}, & \text{if } \lambda = 2 \end{cases} \quad (9)$$

where $v_{SCID}=(n_{SCID}+\lambda)\mod 2$, and $\lambda \in \{0,1,2\}$ represents the index of a CDM group. In addition, l is the OFDM symbol number within the slot and $n_{s,f}^{\mu}$ is the slot number within a frame. The value of quantity $n_{SCID} \in \{0,1\}$ can be indicated by the DMRS initialization field (if present) in the DCI, otherwise $n_{SCID}=0$. In this case, the value of quantity $n_{SCID}$ equals to the value indicated by the DMRS initialization field (if present). $N_{ID}^0$, $N_{ID}^1$ and/or $N_{ID}^2$ are configured by the higher-layer parameters, otherwise $N_{ID}^2=N_{ID}^{cell}$, $N_{ID}^1=N_{ID}^{cell}$ and/or $N_{ID}^0=N_{ID}^{cell}$.

In some embodiments, for DL and/or UL DMRS transmission, CDM group specific sequences are needed even if DMRS ports configured to a given terminal device all come from a same CDM group. In some embodiments, as shown in FIGS. 2C and 2D, for DMRS type 2, there are up to three CDM groups. In some embodiments, for CDM group 0 and CDM group 1, the quantity $n_{SCID} \in \{0,1\}$ indicated in the DMRS initialization field of the DCI can be used to indicate two different DMRS sequences. In addition, for CDM group 2, default scrambling identity (such as, $N_{ID}^{cell}$) may be needed to indicate the DMRS sequence. In some embodiments, the network device 110 and/or the terminal device 120 may generate the DMRS sequences by initializing the pseudo-random sequence generator with $c_{init}'$ according to Table 5.1, Table 5.2, Table 5.3. In Table 5.1 and Table 5.2 and Table 5.3, "$c_{init}$" represents the value calculated according to the formula (5) based on $n_{SCID}$ and $N_{ID}^P$.

TABLE 5.1

| DMRS sequence initialization | $c_{init}'$ |
|---|---|
| 0 | $c_{init}$ with $n_{SCID} = 0$ and $N_{ID}^0$ for DMRS CDM group 0, |
|  | $c_{init}$ with $n_{SCID} = 1$ and $N_{ID}^1$ for DMRS CDM group 1, |
|  | $c_{init}$ with $n_{SCID} = 0$ and $N_{ID}^{cell}$ for DMRS CDM group 2. |
| 1 | $c_{init}$ with $n_{SCID} = 1$ and $N_{ID}^1$ for DMRS CDM group 0, |
|  | $c_{init}$ with $n_{SCID} = 0$ and $N_{ID}^0$ for DMRS CDM group 1, |
|  | $c_{init}$ with $n_{SCID} = 1$ and $N_{ID}^{cell}$ for DMRS CDM group 2. |

TABLE 5.2

| DMRS sequence initialization | $c_{init}'$ |
|---|---|
| 0 | $c_{init}$ with $n_{SCID} = 0$ and $N_{ID}^0$ for DMRS CDM group 0, |
|  | $c_{init}$ with $n_{SCID} = 0$ and $N_{ID}^1$ for DMRS CDM group 1, |
|  | $c_{init}$ with $n_{SCID} = 0$ and $N_{ID}^{cell}$ for DMRS CDM group 2. |

TABLE 5.2-continued

| DMRS sequence initialization | $c_{init}'$ |
|---|---|
| 1 | $c_{init}$ with $n_{SCID} = 1$ and $N_{ID}^1$ for DMRS CDM group 0, |
|  | $c_{init}$ with $n_{SCID} = 1$ and $N_{ID}^0$ for DMRS CDM group 1, |
|  | $c_{init}$ with $n_{SCID} = 1$ and $N_{ID}^{cell}$ for DMRS CDM group 2. |

TABLE 5.3

| DMRS sequence initialization | $c_{init}'$ |
|---|---|
| 0 | $c_{init}$ with $n_{SCID} = 0$ and $N_{ID}^0$ for DMRS CDM group 0, |
|  | $c_{init}$ with $n_{SCID} = 1$ and $N_{ID}^0$ for DMRS CDM group 1, |
|  | $c_{init}$ with $n_{SCID} = 0$ and $N_{ID}^{cell}$ for DMRS CDM group 2. |
| 1 | $c_{init}$ with $n_{SCID} = 0$ and $N_{ID}^1$ for DMRS CDM group 0, |
|  | $c_{init}$ with $n_{SCID} = 1$ and $N_{ID}^1$ for DMRS CDM group 1, |
|  | $c_{init}$ with $n_{SCID} = 1$ and $N_{ID}^{cell}$ for DMRS CDM group 2. |

In some embodiments, if all of $N_{ID}^0$, $N_{ID}^1$ and $N_{ID}^2$ are configured by the higher-layer parameters, the value of $c_{init}'$ may be calculated according to Table 4. In some embodiments, if only $N_{ID}^0$ and $N_{ID}^1$ are configured by the higher-layer parameters, the value of $c_{init}'$ may be calculated according to Table 4, where $N_{ID}^2=N_{ID}^{cell}$. In some embodiments, if none of $N_{ID}^0$, $N_{ID}^1$ and $N_{ID}^2$ is configured by the higher-layer parameters, the value of $c_{init}'$ may be calculated according to Table 4, where $N_{ID}^0=N_{ID}^{cell}$, $N_{ID}^1=N_{ID}^{cell}$, and $N_{ID}^2=N_{ID}^{cell}$. In other words, in this case, only values of $n_{SCID}$ or $v_{SCID}$ are different for the calculation of values of $c_{init}'$ for CDM group 0, CDM group 1 and CDM group 2.

In some embodiments, the terminal device 120 in the case of UL DMRS transmission or the network device 110 in the case of DL DMRS transmission may generate the DMRS sequences by initializing the pseudo-random sequence generator with $c_{init}'$ as following:

$$c_{init}' = \begin{cases} \left(2^{17}\left(N_{symb}^{slot}n_{s,f}^{\mu}+l+1\right)\left(2N_{ID}^{v_{SCID}}+1\right)+ \\ 2N_{ID}^{v_{SCID}}+v_{SCID}\right)\mod 2^{31}, & \text{if } \lambda = 0 \text{ or } 1 \\ \left(2^{17}\left(N_{symb}^{slot}n_{s,f}^{\mu}+l+1\right)\left(2N_{ID}^{cell}+1\right)+ \\ 2N_{ID}^{cell}+n_{SCID}\right)\mod 2^{31}, & \text{if } \lambda = 2 \end{cases} \quad (10)$$

where $v_{SCID}=(n_{SCID}+\lambda)\mod 2$, and $\lambda \in \{0,1,2\}$ represents the index of a CDM group. In addition, l is the OFDM symbol number within the slot and $n_{s,f}^{\mu}$ is the slot number within a frame. The value of quantity $n_{SCID}$ $\{0,1\}$ can be indicated by the DMRS initialization field (if present) in the DCI, otherwise $n_{SCID}=0$. In this case, the value of quantity $n_{SCID}$ equals to the value indicated by the DMRS initialization field (if present). $N_{ID}^0$, $N_{ID}^1$ and/or $N_{ID}^2$ are configured by the higher-layer parameters, otherwise $N_{ID}^2=N_{ID}^{cell}$, $N_{ID}^1=N_{ID}^{cell}$ and/or $N_{ID}^0=N_{ID}^{cell}$.

Figure 7:
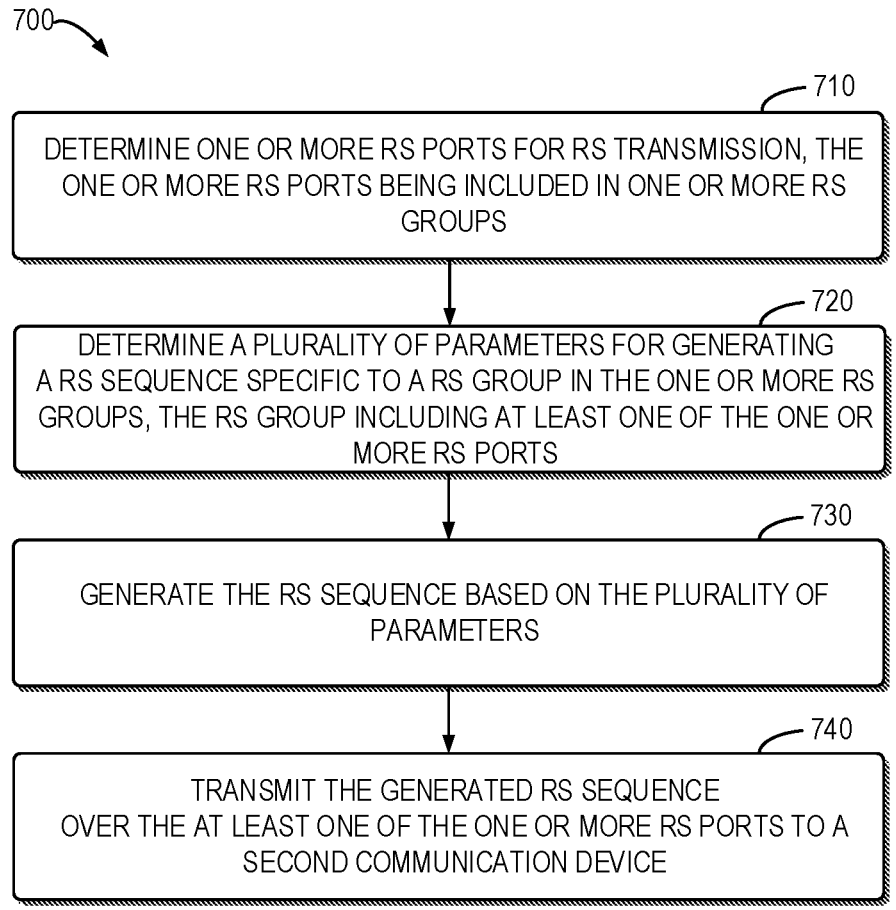
FIG. 7 shows a flowchart of an example method for RS transmission according to some embodiments of the present disclosure.

FIG. 7 shows a flowchart of an example method 700 in accordance with some embodiments of the present disclosure. The method 700 can be implemented at a first communication device which generates and transmits RS sequence(s) to a second communication device. For example, in the case of UL RS transmission, the first communication device may be the terminal device 120. In the case of DL RS transmission, the first communication device may be the network device 110. It is to be understood that the method 700 may include additional blocks not shown and/or may omit some blocks as shown, and the scope of the present disclosure is not limited in this regard.

At block 710, the first communication device determines one or more RS ports for RS transmission, the one or more RS ports being included in one or more RS groups.

At block 720, the first communication device determines a plurality of parameters for generating a RS sequence specific to a RS group in the one or more RS groups, the RS group including at least one of the one or more RS ports.

At block 730, the first communication device generates the RS sequence based on the plurality of parameters.

At block 740, the first communication device transmits the generated RS sequence over the at least one of the one or more RS ports to the second communication device.

In some embodiments, in the case of DL RS transmission, the first communication device may be the network device 110, and the second communication device may be the terminal device 120.

In some embodiments, in the case of DL RS transmission, the network device 110 may transmit an indication of the one or more RS ports to the terminal device 120 via DCI.

In some embodiments, in the case of DL RS transmission, the network device 110 may transmit indications of the plurality of parameters to the terminal device 120 via DCI and/or higher layer signaling.

In some embodiments, in the case of UL RS transmission, the second communication device may be the network device 110, and the first communication device may be the terminal device 120.

In some embodiments, in the case of UL RS transmission, in response to receiving an indication of the one or more RS ports from the network device 110, the terminal device 120 may determine the one or more RS ports based on the indication.

In some embodiments, in the case of UL RS transmission, in response to receiving indications of the plurality of parameters from the network device 110, the terminal device 120 may determine the plurality of parameters based on the indications.

In some embodiments, the plurality of parameters may at least include one or more scrambling identities, a RS sequence initialization parameter and an index of the RS group. In some embodiments, the first communication device may generate the RS sequence by: in response to the index of the RS group being below a predetermined value, deriving a virtual RS sequence initialization parameter (that is, P or $v_{SCID}$) by performing a modulo operation on a sum of the RS sequence initialization parameter and the index of the RS group; and generating the RS sequence based on the virtual RS sequence initialization parameter and the one or more scrambling identities.

In some embodiments, the plurality of parameters may include a further scrambling identity (that is, $N_{ID}^2$) in addition to the one or more scrambling identities. In some embodiments, the first communication device may generate the RS sequence by: in response to the index of the RS group being equal to the predetermined value, generating the RS sequence based on the further scrambling identity and the RS sequence initialization parameter.

Figure 8:
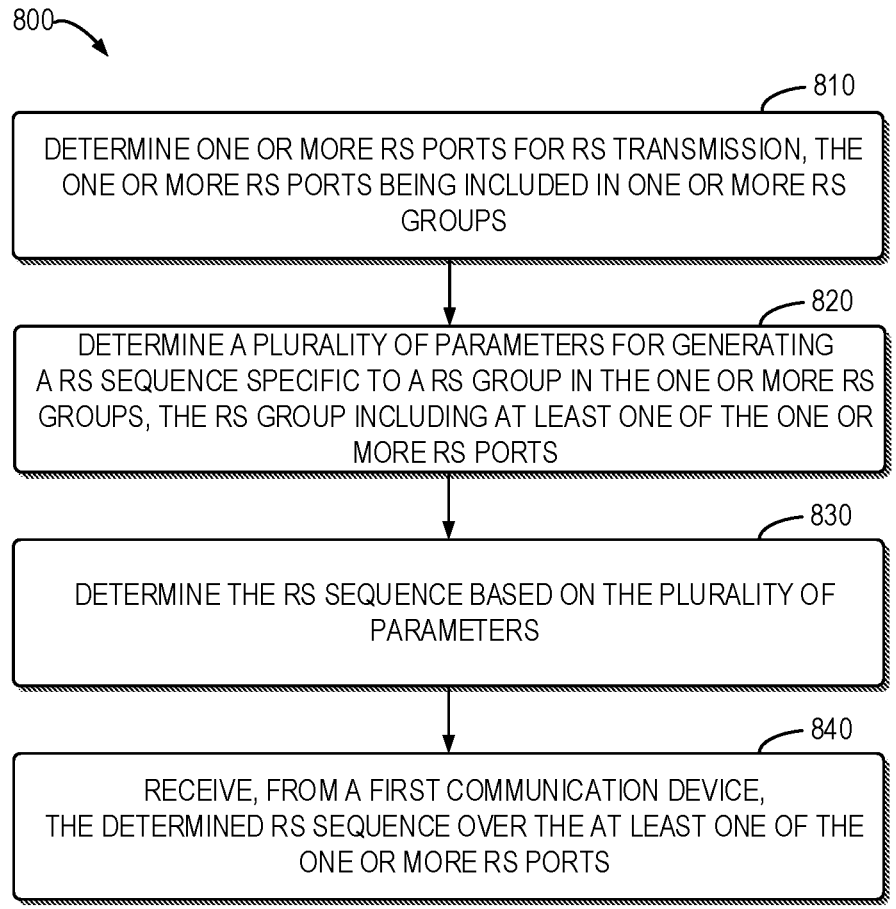
FIG. 8 shows a flowchart of an example method for RS transmission according to some embodiments of the present disclosure.

FIG. 8 shows a flowchart of an example method 800 in accordance with some embodiments of the present disclosure. The method 800 can be implemented at a second communication device which receives RS sequence(s) transmitted from a first communication device. For example, in the case of DL RS transmission, the second communication device may be the terminal device 120. In the case of UL RS transmission, the second communication device may be the network device 110. It is to be understood that the method 800 may include additional blocks not shown and/or may omit some blocks as shown, and the scope of the present disclosure is not limited in this regard.

At block 810, the second communication device determines one or more RS ports for RS transmission, the one or more RS ports being included in one or more RS groups.

At block 820, the second communication device determines a plurality of parameters for generating a RS sequence specific to a RS group in the one or more RS groups, the RS group including at least one of the one or more RS ports.

At block 830, the second communication device determines the RS sequence based on the plurality of parameters.

At block 840, the second communication device receives the determined RS sequence over the at least one of the one or more RS ports from the first communication device.

In some embodiments, in the case of DL RS transmission, the first communication device may be the network device 110, and the second communication device may be the terminal device 120.

In some embodiments, in the case of DL RS transmission, in response to receiving an indication of the one or more RS ports from the network device 110, the terminal device 120 may determine the one or more RS ports based on the indication.

In some embodiments, in the case of DL RS transmission, in response to receiving indications of the plurality of parameters from the network device 110, the terminal device 120 may determine the plurality of parameters based on the indications.

In some embodiments, in the case of UL RS transmission, the second communication device may be the network device 110, and the first communication device may be the terminal device 120.

In some embodiments, in the case of UL RS transmission, the network device 110 may transmit an indication of the one or more RS ports to the terminal device via DCI.

In some embodiments, in the case of UL RS transmission, the network device 110 may transmit indications of the plurality of parameters to the terminal device via DCI and/or higher layer signaling.

In some embodiments, the plurality of parameters may at least include one or more scrambling identities, a RS sequence initialization parameter and an index of the RS group. In some embodiments, the second communication device may determine the RS sequence by: in response to the index of the RS group being below a predetermined value, deriving a virtual RS sequence initialization parameter (that is, $v_{SCID}$) by performing a modulo operation on a sum of the RS sequence initialization parameter and the index of the RS group; and determining the RS sequence based on the virtual RS sequence initialization parameter and the one or more scrambling identities.

In some embodiments, the plurality of parameters may include a further scrambling identity (that is, $N_{ID}^2$) in addition to the one or more scrambling identities. In some embodiments, the second communication device may determine the RS sequence by: in response to the index of the RS group being equal to the predetermined value, determining the RS sequence based on the further scrambling identity and the RS sequence initialization parameter.

Figure 9:
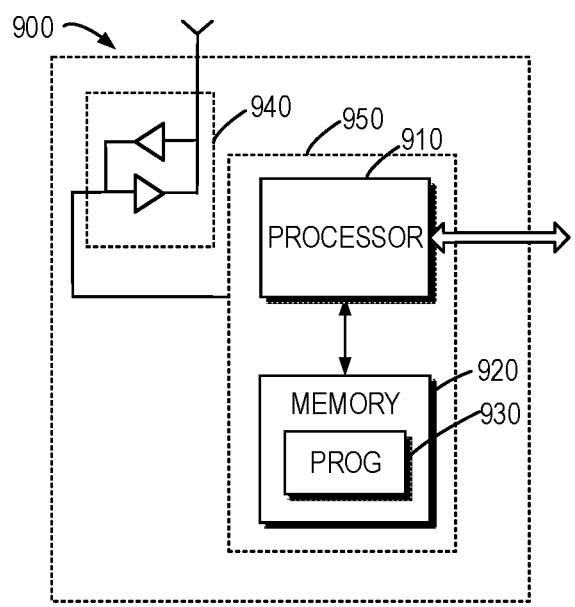
FIG. 9 shows a simplified block diagram of a device that is suitable for implementing embodiments of the present disclosure.

FIG. 9 is a simplified block diagram of a device 900 that is suitable for implementing embodiments of the present disclosure. The device 900 can be considered as a further example implementation of the network device 110 or the terminal device 120 as shown in FIG. 1. Accordingly, the device 900 can be implemented at or as at least a part of the network device 110 or the terminal device 120.

As shown, the device 900 includes a processor 910, a memory 920 coupled to the processor 910, a suitable transmitter (TX) and receiver (RX) 940 coupled to the processor 910, and a communication interface coupled to the TX/RX 940. The memory 910 stores at least a part of a program 930. The TX/RX 940 is for bidirectional communications. The TX/RX 940 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 930 is assumed to include program instructions that, when executed by the associated processor 910, enable the device 900 to operate in accordance with the embodiments of the present disclosure, as discussed herein with reference to FIGS. 1 to 8. The embodiments herein may be implemented by computer software executable by the processor 910 of the device 900, or by hardware, or by a combination of software and hardware. The processor 910 may be configured to implement various embodiments of the present disclosure. Furthermore, a combination of the processor 910 and memory 920 may form processing means 950 adapted to implement various embodiments of the present disclosure.

The memory 920 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 920 is shown in the device 900, there may be several physically distinct memory modules in the device 900. The processor 910 may be of any type suitable to the local technical network, and may include one or more of general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 7-8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A network device comprising a processor configured to:
determine an initial value for generating an DMRS (DeModulation Reference Signal) sequence by performing a modulo operation on a sum of parameters;
transmit, to a terminal, information on the initial value; and
transmit, to the terminal, the DMRS sequence via an DMRS port, wherein
the parameters at least include a parameter derived based on an index of an CDM (Code Division Multiplexing) group and a DMRS sequence initialization quantity, wherein
the DMRS port is included in the CDM group, wherein
a value of the parameter is 0 when the index of the CDM group is 0 and the DMRS sequence initialization quantity is 0, wherein
the value of the parameter is 1 when the index of the CDM group is 1 and the DMRS sequence initialization quantity is 0, wherein
the value of the parameter is 0 when the index of the CDM group is 2 and the DMRS sequence initialization quantity is 0, wherein
the value of the parameter is 1 when the index of the CDM group is 0 and the DMRS sequence initialization quantity is 1, wherein
the value of the parameter is 0 when the index of the CDM group is 1 and the DMRS sequence initialization quantity is 1, wherein
the value of the parameter is 1 when the index of the CDM group is 2 and the DMRS sequence initialization quantity is 1.

2. A terminal comprising a processor configured to:
receive, from a network device, information on an initial value for generating an DMRS (DeModulation Reference Signal) sequence;
receive, from the network device, the DMRS sequence via an DMRS port; and
demodulate the DMRS sequence based on the initial value determined by performing a modulo operation on a sum of parameters, wherein
the parameters at least include a parameter derived based on an index of an CDM (Code Division Multiplexing) group and a DMRS sequence initialization quantity, wherein
the DMRS port is included in the CDM group, wherein
a value of the parameter is 0 when the index of the CDM group is 0 and the DMRS sequence initialization quantity is 0, wherein
the value of the parameter is 1 when the index of the CDM group is 1 and the DMRS sequence initialization quantity is 0, wherein
the value of the parameter is 0 when the index of the CDM group is 2 and the DMRS sequence initialization quantity is 0, wherein
the value of the parameter is 1 when the index of the CDM group is 0 and the DMRS sequence initialization quantity is 1, wherein
the value of the parameter is 0 when the index of the CDM group is 1 and the DMRS sequence initialization quantity is 1, wherein
the value of the parameter is 1 when the index of the CDM group is 2 and the DMRS sequence initialization quantity is 1.

3. A network device comprising a processor configured to:
receive, from a terminal, information on an initial value for generating an DMRS (DeModulation Reference Signal) sequence;
receive, from the terminal, the DMRS sequence via an DMRS port; and
demodulate the DMRS sequence based on the initial value determined by performing a modulo operation on a sum of parameters, wherein
the parameters at least include a parameter derived based on an index of an CDM (Code Division Multiplexing) group and a DMRS sequence initialization quantity, wherein
the DMRS port is included in the CDM group,
a value of the parameter is 0 when the index of the CDM group is 0 and the DMRS sequence initialization quantity is 0, wherein
the value of the parameter is 1 when the index of the CDM group is 1 and the DMRS sequence initialization quantity is 0, wherein
the value of the parameter is 0 when the index of the CDM group is 2 and the DMRS sequence initialization quantity is 0, wherein
the value of the parameter is 1 when the index of the CDM group is 0 and the DMRS sequence initialization quantity is 1, wherein
the value of the parameter is 0 when the index of the CDM group is 1 and the DMRS sequence initialization quantity is 1, wherein
the value of the parameter is 1 when the index of the CDM group is 2 and the DMRS sequence initialization quantity is 1.

4. A terminal comprising a processor configured to:
determine an initial value for generating an DMRS (DeModulation Reference Signal) sequence by performing a modulo operation on a sum of parameters;
transmit, to a network device, information on the initial value; and
transmit, to the network device, the DMRS sequence via an DMRS port, wherein
the parameters at least include a parameter derived based on an index of an CDM (Code Division Multiplexing) group and a DMRS sequence initialization quantity, wherein
the DMRS port is included in the CDM group,
a value of the parameter is 0 when the index of the CDM group is 0 and the DMRS sequence initialization quantity is 0, wherein
the value of the parameter is 1 when the index of the CDM group is 1 and the DMRS sequence initialization quantity is 0, wherein
the value of the parameter is 0 when the index of the CDM group is 2 and the DMRS sequence initialization quantity is 0, wherein
the value of the parameter is 1 when the index of the CDM group is 0 and the DMRS sequence initialization quantity is 1, wherein the value of the parameter is 0 when the index of the CDM group is 1 and the DMRS sequence initialization quantity is 1, wherein the value of the parameter is 1 when the index of the CDM group is 2 and the DMRS sequence initialization quantity is 1.

5. A method comprising:

determining an initial value for generating an DMRS (DeModulation Reference Signal) sequence by performing a modulo operation on a sum of parameters;

transmitting information on the initial value; and transmitting the DMRS sequence via an DMRS port, wherein the parameters at least include a parameter derived based on an index of an CDM (Code Division Multiplexing) group and a DMRS sequence initialization quantity, wherein the DMRS port is included in the CDM group, wherein a value of the parameter is 0 when the index of the CDM group is 0 and the DMRS sequence initialization quantity is 0, wherein the value of the parameter is 1 when the index of the CDM group is 1 and the DMRS sequence initialization quantity is 0, wherein the value of the parameter is 0 when the index of the CDM group is 2 and the DMRS sequence initialization quantity is 0, wherein the value of the parameter is 1 when the index of the CDM group is 0 and the DMRS sequence initialization quantity is 1, wherein the value of the parameter is 0 when the index of the CDM group is 1 and the DMRS sequence initialization quantity is 1, wherein the value of the parameter is 1 when the index of the CDM group is 2 and the DMRS sequence initialization quantity is 1.

6. A method comprising:

receiving information on an initial value for generating an DMRS (DeModulation Reference Signal) sequence;

receiving the DMRS sequence via an DMRS port; and demodulating the DMRS sequence based on the initial value determined by performing a modulo operation on a sum of parameters, wherein the parameters at least include a parameter derived based on an index of an CDM (Code Division Multiplexing) group and a DMRS sequence initialization quantity, wherein the DMRS port is included in the CDM group, wherein a value of the parameter is 0 when the index of the CDM group is 0 and the DMRS sequence initialization quantity is 0, wherein the value of the parameter is 1 when the index of the CDM group is 1 and the DMRS sequence initialization quantity is 0, wherein the value of the parameter is 0 when the index of the CDM group is 2 and the DMRS sequence initialization quantity is 0, wherein the value of the parameter is 1 when the index of the CDM group is 0 and the DMRS sequence initialization quantity is 1, wherein the value of the parameter is 0 when the index of the CDM group is 1 and the DMRS sequence initialization quantity is 1, wherein the value of the parameter is 1 when the index of the CDM group is 2 and the DMRS sequence initialization quantity is 1.

* * * * *